(12) United States Patent
Watanabe et al.

(10) Patent No.: US 10,272,472 B2
(45) Date of Patent: Apr. 30, 2019

(54) ULTRASONIC SENSOR

(71) Applicant: Murata Manufacturing Co., Ltd., Nagaokakyo-shi, Kyoto-fu (JP)

(72) Inventors: Kosuke Watanabe, Nagaokakyo (JP); Jun Tabota, Nagaokakyo (JP); Kenji Matsuo, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 291 days.

(21) Appl. No.: 15/270,227

(22) Filed: Sep. 20, 2016

(65) Prior Publication Data
US 2017/0008032 A1    Jan. 12, 2017

Related U.S. Application Data

(63) Continuation of application No. PCT/JP2015/059579, filed on Mar. 27, 2015.

(30) Foreign Application Priority Data

Mar. 31, 2014    (JP) ................................. 2014-071826

(51) Int. Cl.
*B60B 1/06*    (2006.01)
*B06B 1/06*    (2006.01)
*G01H 11/08*    (2006.01)

(52) U.S. Cl.
CPC .......... *B06B 1/0622* (2013.01); *B06B 1/0603* (2013.01); *B06B 1/0611* (2013.01); *G01H 11/08* (2013.01)

(58) Field of Classification Search
CPC ... B06B 1/0622; B06B 1/0603; B06B 1/0611; H01L 41/1132; H01L 41/047
(Continued)

(56) References Cited

U.S. PATENT DOCUMENTS 6,640,634 B2    11/2003  Hashimoto et al.
7,609,133 B2 *  10/2009  Osugi ..................... H03H 3/02
                                                    310/322
(Continued)

FOREIGN PATENT DOCUMENTS

EP    1158586 A1    11/2001
JP    H01270499 A   10/1989
(Continued)

OTHER PUBLICATIONS

International Search Report issued for PCT/JP2015/059579, dated Jun. 16, 2015.
(Continued)

*Primary Examiner* — Derek J Rosenau
(74) *Attorney, Agent, or Firm* — Arent Fox LLP

(57) ABSTRACT

An ultrasonic sensor including a case having a bottom portion, and a piezoelectric element that is bonded to an inner surface of the bottom portion and performs bending vibration together with the bottom portion. The piezoelectric element includes a piezoelectric layer having a transmission region and a reception region, a common electrode, a transmission electrode opposing the common electrode with the transmission region interposed therebetween, and a reception electrode opposing the common electrode with the reception region interposed therebetween. The transmission region and the reception region are formed at positions adjacent to each other.

20 Claims, 14 Drawing Sheets

(58) Field of Classification Search
USPC .................................. 310/322, 338, 365, 366
See application file for complete search history.

(56) References Cited

U.S. PATENT DOCUMENTS

| | | |
|---|---|---|
| 2002/0073781 A1 | 6/2002 | Hashimoto et al. |
| 2010/0210949 A1 | 8/2010 | Habu et al. |
| 2010/0281962 A1* | 11/2010 | Shih .................... A61B 5/0053 |
| | | 73/78 |

FOREIGN PATENT DOCUMENTS

| | | | |
|---|---|---|---|
| JP | 2001309493 A | 11/2001 | |
| JP | 2002204497 A | 7/2002 | |
| JP | 2002-248100 A | 9/2002 | |
| JP | 2002336248 A | 11/2002 | |
| JP | 2010154371 A | 7/2010 | |
| JP | 2011-3990 A | 1/2011 | |

OTHER PUBLICATIONS

Written Opinion of the International Searching Authority issued for PCT/JP2015/059579, dated June 16, 2015.

\* cited by examiner

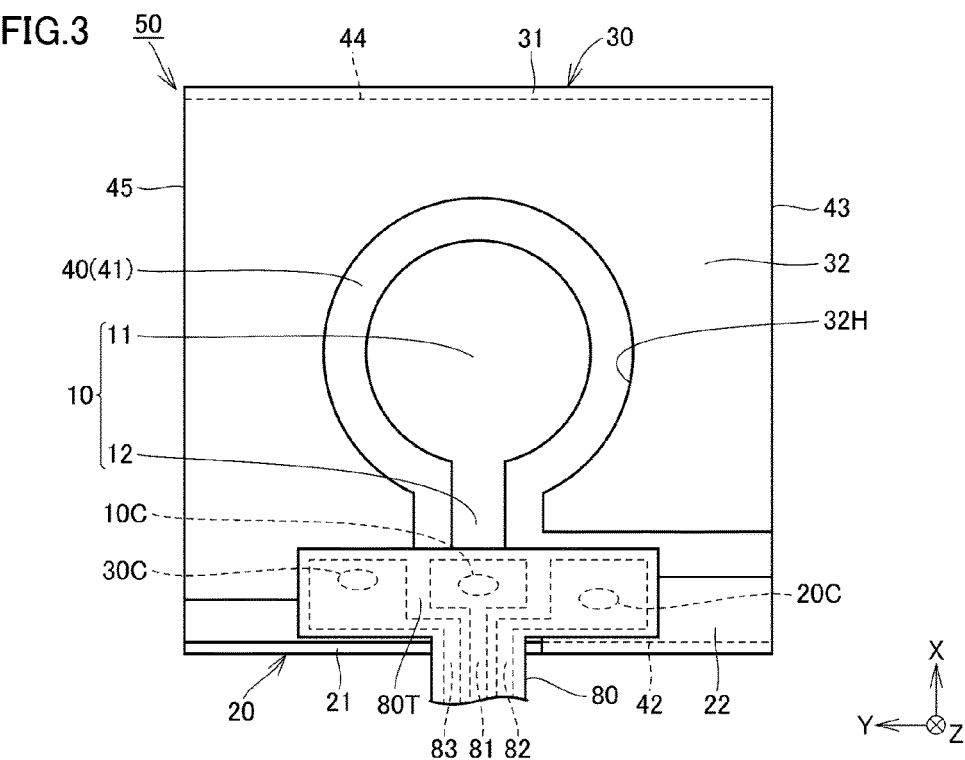
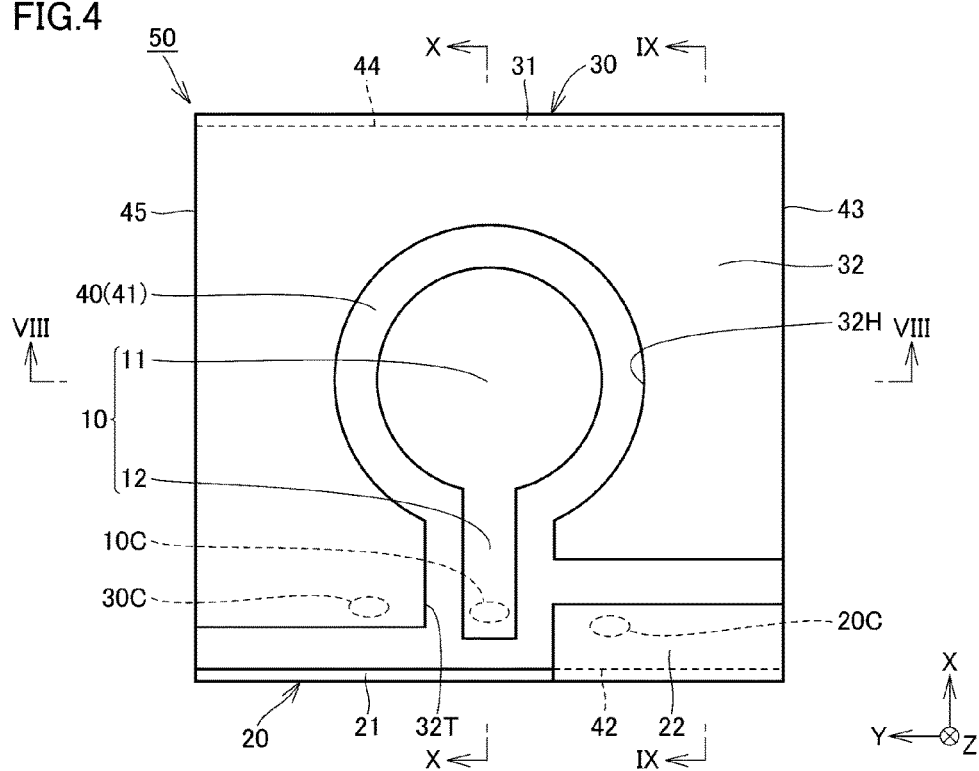

ULTRASONIC SENSOR

CROSS REFERENCE TO RELATED APPLICATIONS

The present application is a continuation of PCT/JP2015/059579 filed Mar. 27, 2015, which claims priority to Japanese Patent Application No. 2014-071826, filed Mar. 31, 2014, the entire contents of each of which are incorporated herein by reference.

TECHNICAL FIELD

The present disclosure relates to an ultrasonic sensor including a piezoelectric element.

BACKGROUND

A general ultrasonic sensor provides a unimorph structure by bonding a piezoelectric element to an inner surface of a bottom portion of a case made of metal and transmits and receives ultrasonic waves by causing the bottom portion of the metal case to perform bending vibration. Japanese Unexamined Patent Application Publication No. 2002-204497 (Patent Document 1) discloses an ultrasonic sensor including a multilayer piezoelectric element.

Patent Document 1: Japanese Unexamined Patent Application Publication No. 2002-204497.

When, for example, the ultrasonic sensor as disclosed in Japanese Unexamined Patent Application Publication No. 2002-204497 (Patent Document 1) is driven, the following characteristics are provided. That is, as the number of laminated layers of the piezoelectric element included in the ultrasonic sensor increases, sound pressure in transmission is increased whereas sensitivity in reception is decreased. By contrast, when a piezoelectric element in which the number of laminated layers is reduced as disclosed in the above-described document, the sound pressure in the transmission is decreased whereas the sensitivity in the reception is increased.

Thus, in the conventional multilayer piezoelectric element used for the ultrasonic sensor, a portion of the piezoelectric element which is provided for the transmission and a portion thereof which is provided for the reception, are formed in the same section. Therefore, the conventional multilayer piezoelectric element provides characteristics in which the sound pressure and the sensitivity are increased and decreased, respectively, being substantially proportional or inversely proportional to the number of laminated layers of the piezoelectric element. The ultrasonic sensor including the conventional multilayer piezoelectric element has been under an actual circumstance that it is difficult to adjust both the sound pressure in the transmission and the sensitivity in the reception independently of each other.

SUMMARY OF THE INVENTION

An object of the present disclosure is to provide an ultrasonic sensor capable of adjusting both the sound pressure in the transmission and the sensitivity in the reception independently of each other.

Accordingly, an ultrasonic sensor is disclosed that includes a case having a bottom portion, and a piezoelectric element that is bonded to an inner surface of the bottom portion and performs bending vibration together with the bottom portion, wherein the piezoelectric element includes a piezoelectric layer having a transmission region and a reception region, a common electrode, a transmission electrode opposing the common electrode with the transmission region interposed between the transmission electrode and the common electrode, and a reception electrode opposing the common electrode with the reception region interposed between the reception electrode and the common electrode, and the transmission region and the reception region are formed at positions adjacent to each other.

It is preferable that impedance between the transmission electrode and the common electrode be different from impedance between the reception electrode and the common electrode.

More specifically, it is preferable that the impedance between the transmission electrode and the common electrode be lower than the impedance between the reception electrode and the common electrode.

Furthermore, it is preferable that the transmission region and the reception region are formed at positions adjacent to each other in a direction perpendicular to the inner surface of the bottom portion.

It is preferable that the transmission region and the reception region be formed at positions adjacent to each other in a surface direction of the inner surface of the bottom portion.

Moreover, it is preferable that the reception region be provided at a center portion of the piezoelectric element when seen from the above, and the transmission region be provided on a peripheral portion as an outer side portion relative to the reception region in a radial direction so as to surround the reception region.

It is preferable that the common electrode be a common bus having a shape extending over both the transmission region and the reception region.

It is preferable that the transmission region include one first piezoelectric layer or a plurality of first piezoelectric layers which are laminated in a direction of being distanced from the bottom portion and are electrically connected in parallel, and the reception region include one second piezoelectric layer or a plurality of second piezoelectric layers which are laminated in a direction of being distanced from the bottom portion and are electrically connected in parallel.

It is preferable that the number of first piezoelectric layers be equal to or more than the number of second piezoelectric layers.

It is preferable that the transmission region include one inner electrode or a plurality of inner electrodes which are laminated in a direction of being distanced from the bottom portion and are electrically connected in parallel, the reception region include one inner electrode or a plurality of inner electrodes which are laminated in a direction of being distanced from the bottom portion and are electrically connected in parallel, and the inner electrode(s) included in the transmission region and/or the reception region has(have) a ring-like shape.

It is preferable that a surface area of a surface of the transmission region at a side bonded to the inner surface of the bottom portion be equal to or larger than a surface area of a surface of the reception region at a side bonded to the inner surface of the bottom portion.

It is preferable that a thickness of the transmission region in a direction orthogonal to the bottom portion be equal to or smaller than a thickness of the reception region in the same direction.

An ultrasonic sensor according to another aspect includes a case having a bottom portion, and a piezoelectric element that is bonded to an inner surface of the bottom portion and performs bending vibration together with the bottom portion, wherein the piezoelectric element includes a piezoelectric layer having a transmission region, a reception region, and an isolation region; a common electrode; a transmission electrode opposing the common electrode with the transmission region interposed between the transmission electrode and the common electrode; and a reception electrode opposing the common electrode with the reception region interposed between the reception electrode and the common electrode, and the transmission region and the reception region are formed at positions adjacent to each other with the isolation region interposed between the transmission region and the reception region.

It is preferable that the common electrode be provided so as to extend into the isolation region.

It is preferable that the transmission electrode be provided so as to extend into the isolation region.

It is preferable that the reception electrode be provided so as to extend into the isolation region.

With the above-described configuration, the transmission region and the reception region are formed separately, and both the sound pressure in transmission and the sensitivity in reception can therefore be adjusted independently of each other.

BRIEF DESCRIPTION OF DRAWINGS

FIG. 3 is a plan view illustrating a piezoelectric element and a flexible printed circuit (FPC) included in the ultrasonic sensor in the first embodiment.

FIG. 4 is a plan view illustrating the piezoelectric element (in a state in which the FPC is detached) included in the ultrasonic sensor in the first embodiment.

DETAILED DESCRIPTION

Figure 1:
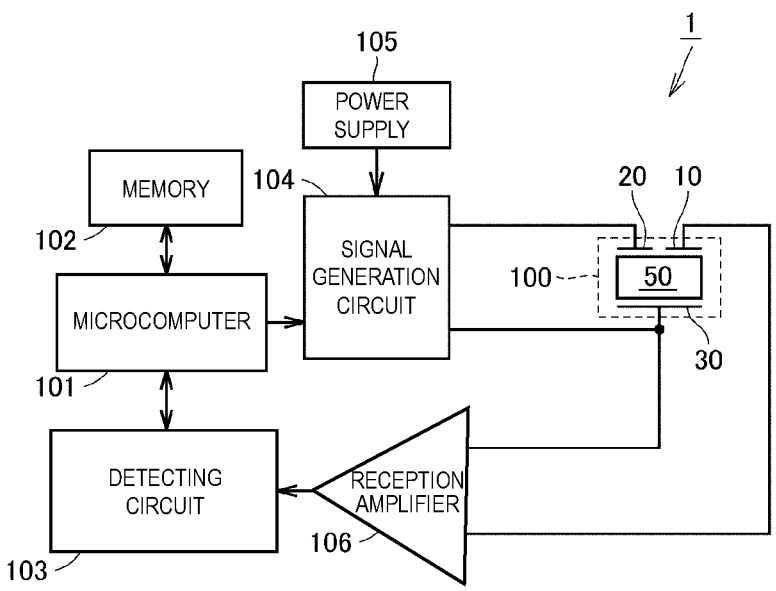
FIG. 1 is a diagram illustrating functional blocks of a sensor device including an ultrasonic sensor in a first embodiment.

Embodiments based on the present disclosure will be described with reference to the drawings. When the number and an amount of components are referred, the scope of the disclosure is not necessarily limited to the number and the amount of them unless otherwise specified. The same reference numerals denote the same components and equivalent components and overlapped description thereof is not repeated in some cases.

[First Embodiment]

An ultrasonic sensor 100 in a first embodiment will be described with reference to FIG. 1 to FIG. 10. FIG. 1 is a diagram illustrating functional blocks of a sensor device 1 including the ultrasonic sensor 100. The sensor device 1 includes, in addition to the ultrasonic sensor 100, a microcomputer 101, a memory 102, a detecting circuit 103, a signal generation circuit 104, a power supply 105, and a reception amplifier 106. As will be described in detail later, the ultrasonic sensor 100 includes a piezoelectric element 50, and the piezoelectric element 50 has a three-terminal structure formed of electrodes 10, 20, and 30.

The microcomputer 101 reads out data stored in the memory 102 and outputs a control signal appropriate for driving of the ultrasonic sensor 100 to the signal generation circuit 104. The power supply 105 outputs a direct-current (DC) voltage of 12 V, for example, to the signal generation circuit 104. The signal generation circuit 104 generates an alternating-current (AC) voltage from the DC voltage based on the control signal output from the microcomputer 101. The AC voltage is supplied to the ultrasonic sensor 100 in a state of being boosted by an amplification circuit (not illustrated) if necessary. The ultrasonic sensor 100 is driven and ultrasonic waves are transmitted into the air or the like from the ultrasonic sensor 100.

Preferably, a resistor, a capacitor, and the like (not illustrated) are connected to the ultrasonic sensor 100 in parallel. During operation, when the ultrasonic sensor 100 receives reflected waves from a target, a reception signal generated in the ultrasonic sensor 100 as a voltage value is transmitted to the reception amplifier 106 and is input to the microcomputer 101 through the detecting circuit 103. Information related to presence or absence and movement of the target can be grasped with the microcomputer 101. The ultrasonic sensor 100 can be mounted on a car, for example, and can provide functions as the sensor device 1 as described above.

(Ultrasonic Sensor 100)

Figure 2:
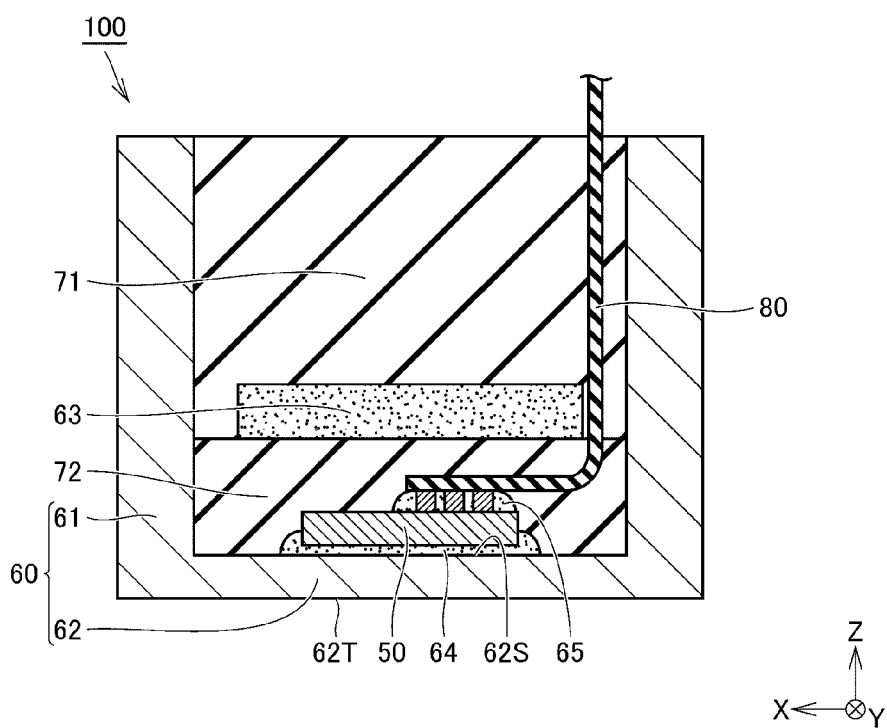
FIG. 2 is a cross-sectional view illustrating the ultrasonic sensor in the first embodiment.

FIG. 2 is a cross-sectional view illustrating the ultrasonic sensor 100. As illustrated in FIG. 2, the ultrasonic sensor 100 includes a piezoelectric element 50, a case 60, a sound absorbing material 63, an adhesive 64, a bonding agent 65, silicones 71 and 72, and a flexible printed circuit (FPC) 80. The case 60 has a cylindrical shape with a bottom. The case 60 is made of aluminum that has high elasticity and is lightweight, for example. The case 60 is produced by performing forging processing or cutting processing on aluminum, for example.

The case 60 includes a disk-like bottom portion 62 and a cylindrical portion 61 provided along a peripheral edge of the bottom portion 62 and formed in a cylindrical shape. The bottom portion 62 has an inner surface 62S and an outer surface 62T. The piezoelectric element 50 is made of PZT-based ceramics, for example. The piezoelectric element 50 is arranged on the inner surface 62S of the bottom portion 62 and is bonded to the inner surface 62S using the adhesive 64. When the ultrasonic sensor 100 is driven, the piezoelectric element 50 performs bending vibration together with the bottom portion 62. The silicones 71 and 72 are provided so as to fill an internal space of the case 60. The sound absorbing material 63 is formed with a molded body having high elasticity and is provided between the silicone 71 and the silicone 72. The sound absorbing material 63 opposes the piezoelectric element 50 at an interval.

The piezoelectric element 50 includes three electrodes (not illustrated) (corresponding to the electrodes 10 to 30 in FIG. 1, and details thereof will be described later). The FPC 80 is electrically bonded to these electrodes with the bonding agent 65 interposed therebetween. A resin material to which metal has been added is used as the bonding agent 65, for example. A portion of the FPC 80 at the side opposite to a portion thereof bonded to the piezoelectric element 50 is extended to the outside of the case 60 and is electrically connected to the signal generation circuit 104 (FIG. 1), the reception amplifier 106 (FIG. 1), and the like.

(Piezoelectric Element 50)

Figure 5:
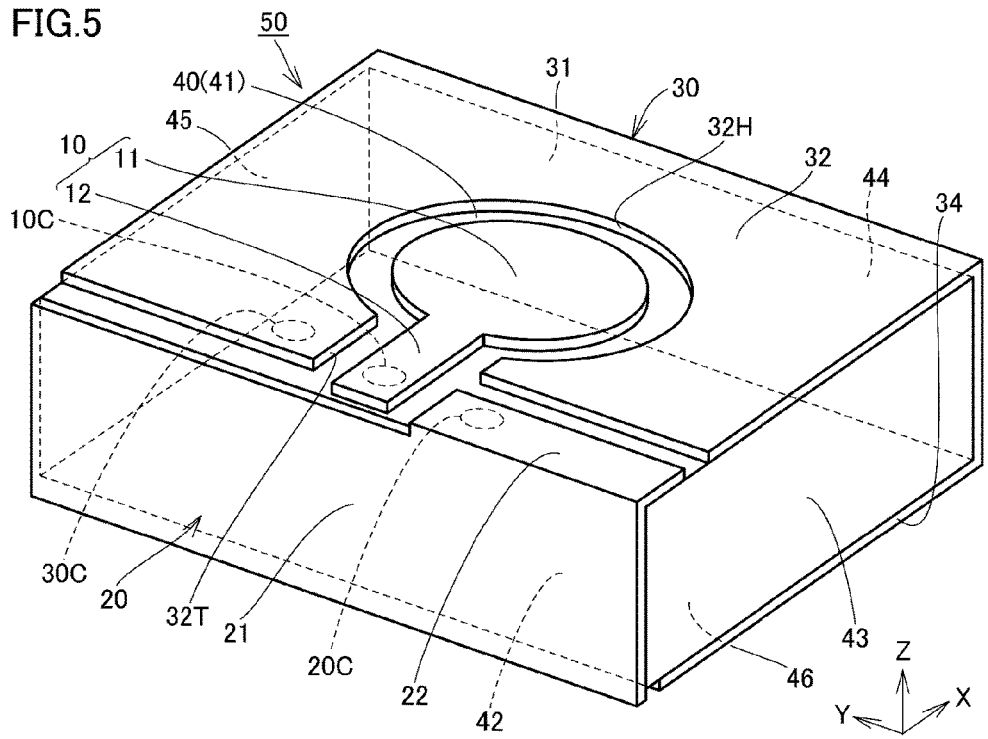
FIG. 5 is a perspective view illustrating the piezoelectric element included in the ultrasonic sensor in the first embodiment.
Figure 6:
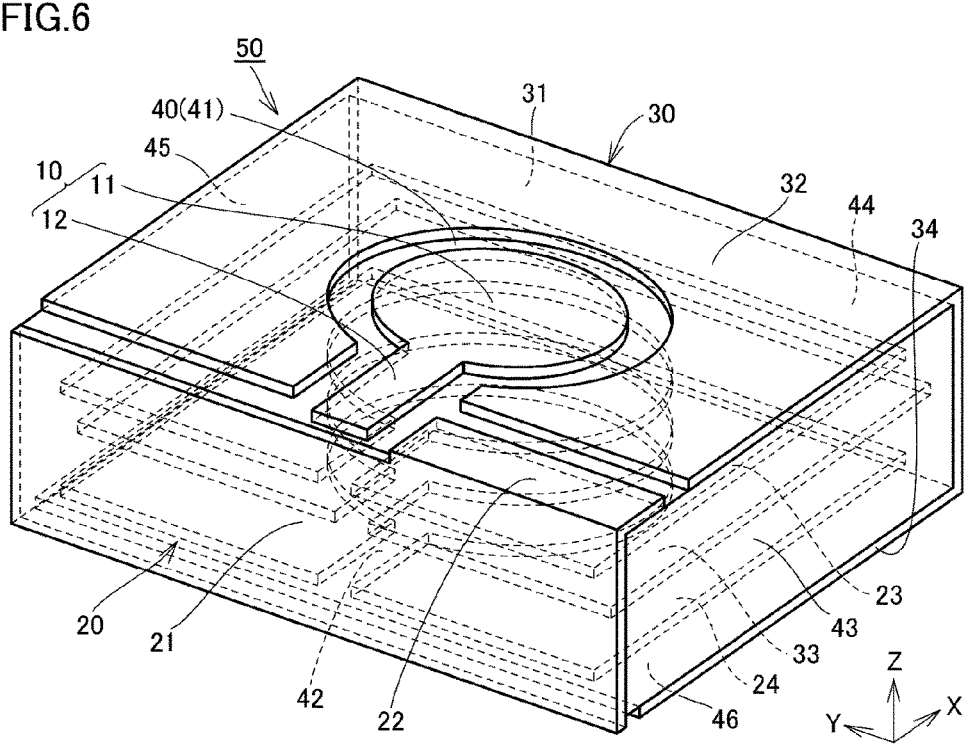
FIG. 6 is a perspective view illustrating the piezoelectric element included in the ultrasonic sensor and the internal structure thereof in the first embodiment.
Figure 7:
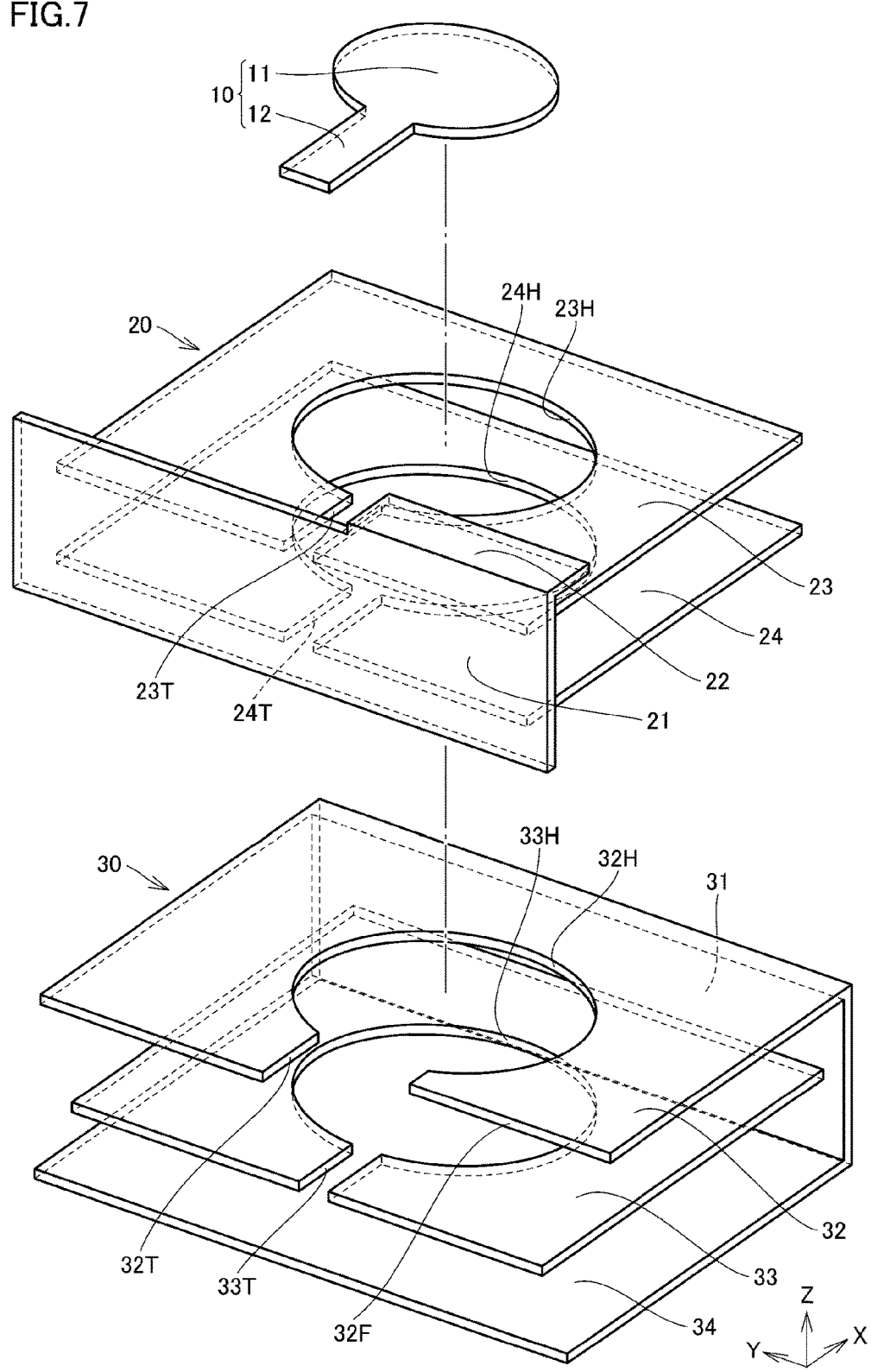
FIG. 7 is a perspective view illustrating electrodes included in the piezoelectric element of the ultrasonic sensor in the first embodiment.
Figure 8:
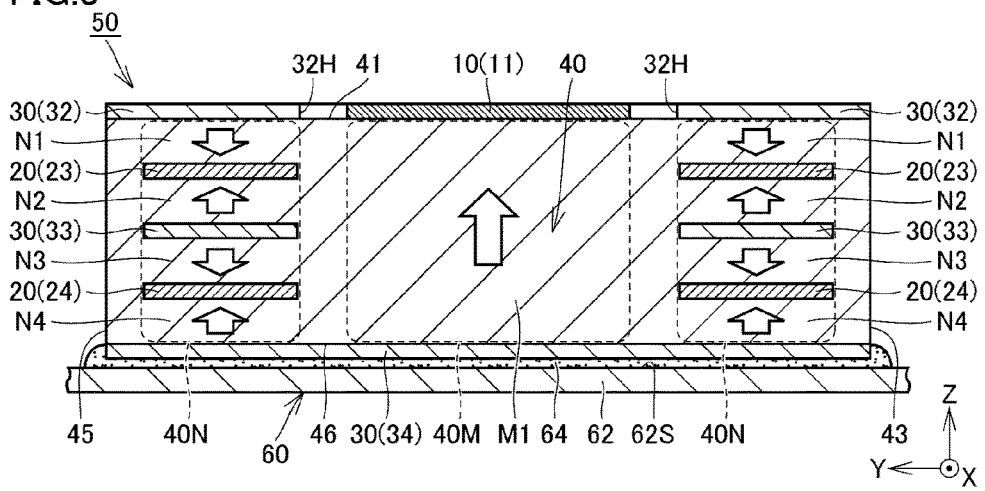
FIG. 8 is a cross-sectional view when seen in an arrow direction along a line VIII-VIII in FIG. 4.
Figure 9:
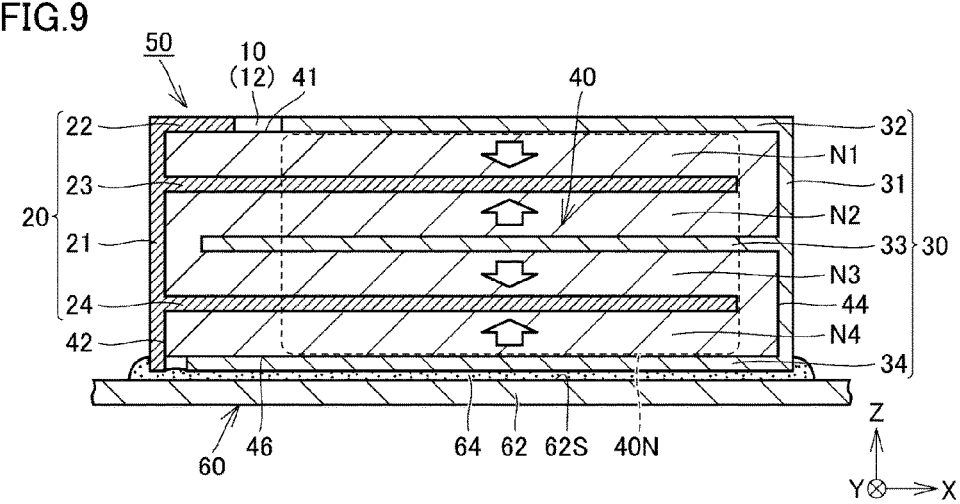
FIG. 9 is a cross-sectional view when seen in an arrow direction along a line IX-IX in FIG. 4.
Figure 10:
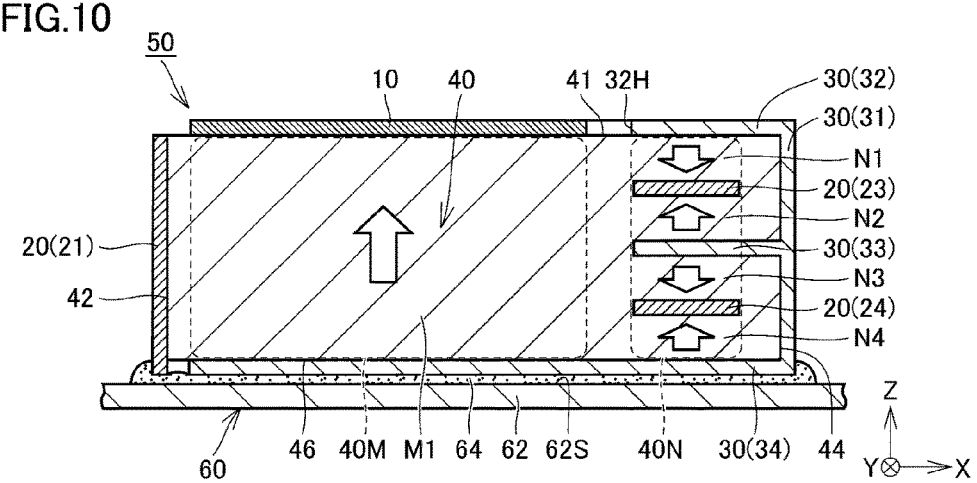
FIG. 10 is a cross-sectional view when seen in an arrow direction along a line X-X in FIG. 4.

FIG. 3 is a plan view illustrating the piezoelectric element 50 and the FPC 80. FIG. 4 is a plan view illustrating the piezoelectric element 50 (in a state in which the FPC 80 is detached). FIG. 5 is a perspective view illustrating the piezoelectric element 50. FIG. 6 is a perspective view illustrating the piezoelectric element 50 and the internal structure thereof. FIG. 7 is a perspective view illustrating the electrodes 10, 20, and 30 included in the piezoelectric element 50. FIG. 8 is a cross-sectional view when seen in the arrow direction along a line VIII-VIII in FIG. 4. FIG. 9 is a cross-sectional view when seen in the arrow direction along a line IX-IX in FIG. 4. FIG. 10 is a cross-sectional view when seen in the arrow direction along a line X-X in FIG. 4.

In FIG. 3 to FIG. 10, arrows X, Y, and Z are indicated for the convenience of description. As shown, the arrows X, Y, and Z have a relation of being orthogonal to one another. Hereinafter, the respective configurations of the piezoelectric element 50 are described with reference to the arrows X, Y, and Z in some cases. However, arrangement relations of the respective configurations (characteristics related to orthogonality and parallelism) are not necessarily limited to arrangement relations as indicated by the arrows X, Y, and Z.

As illustrated in FIG. 3 to FIG. 10, the piezoelectric element 50 includes a piezoelectric layer 40, the electrode 10 (FIG. 7), the electrode 20 (FIG. 7), and the electrode 30 (FIG. 7). The outer shape of the piezoelectric layer 40 is a substantially rectangular parallelepiped shape (see FIG. 5 and FIG. 6) and the piezoelectric layer 40 has an upper surface 41, side surfaces 42 to 45, and a lower surface 46.

The upper surface 41 is a surface of the piezoelectric layer 40, which is located at the arrow Z direction side. The lower surface 46 is a surface of the piezoelectric layer 40, which is located at the opposite direction side to the arrow Z direction. The side surfaces 42 and 44 are surfaces of the piezoelectric layer 40, which are orthogonal to the arrow X direction, and have a positional relation of opposing each other. The side surfaces 43 and 45 are surfaces of the piezoelectric layer 40, which are orthogonal to the arrow Y direction, and have a positional relation of opposing each other.

(Electrode 10 (Reception Electrode))

The electrode 10 includes a disk or disk portion 11 and an extending portion 12 and has a plate-like shape as a whole (see FIG. 7). The extending portion 12 has a rectangular outer shape and has a shape extending toward the outer side from the outer edge of the disk portion 11. The electrode 10 is arranged on the upper surface 41 such that the disk portion 11 is located just at the center of the upper surface 41 of the piezoelectric layer 40. The extending portion 12 is arranged so as to extend toward the side at which the side surface 42 of the piezoelectric layer 40 is located (toward the direction opposite to the arrow X) from the side at which the disk portion 11 is located.

As illustrated in FIG. 3, a leading end portion 80T of the FPC 80 has a T shape. The electrode 10 and the FPC 80 (wiring pattern 81) are electrically connected on a portion (connecting place 10C) between the wiring pattern 81 provided in the FPC 80 and the extending portion 12 of the electrode 10 (also see FIG. 4 and FIG. 5). The electrode 10 functions as a "reception electrode" in the embodiment.

(Electrode 20 (Transmission Electrode))

The electrode 20 includes a side wall portion 21, an upper surface portion 22, and intermediate portions 23 and 24 (see FIG. 7). Each of the side wall portion 21, the upper surface portion 22, and the intermediate portions 23 and 24 has a plate-like shape. The side wall portion 21 is arranged so as to oppose the side surface 42 (FIG. 5) of the piezoelectric layer 40 and make contact with the side surface 42. The side wall portion 21 has a surface shape covering the overall side surface 42 of the piezoelectric layer 40 (see FIG. 3, FIG. 4, FIG. 9, and FIG. 10).

The upper surface portion 22 is provided being continuously connected to an end portion of the side wall portion 21 at the arrow Z direction side (and at the opposite direction side to the arrow Y) and is arranged on the upper surface 41 of the piezoelectric layer 40. When a dimension in the arrow Y direction is assumed to be "width", the upper surface portion 22 has the width smaller than that of the side wall portion 21. An end portion of the upper surface portion 22 in the opposite direction to the arrow Y and the side surface 43 of the piezoelectric layer 40 have a relation of being flush with each other.

Preferably, the upper surface portion 22 and the intermediate portions 23 and 24 extend in a direction parallel to one another. The intermediate portions 23 and 24 are located at the opposite direction side to the arrow Z relative to the upper surface portion 22. The intermediate portion 23 is located between the upper surface portion 22 and the intermediate portion 24. The intermediate portion 23 and the intermediate portion 24 oppose each other at an interval. The intermediate portions 23 and 24 are sections of the electrode 20 which are arranged inside the piezoelectric layer 40, and are not visually recognized in a state in which the piezoelectric element 50 is completed (see FIG. 5). As will be described in detail later, an intermediate portion 33 of the electrode 30 is arranged between the intermediate portion 23 and the intermediate portion 24 (see FIG. 8 to FIG. 10, and the like).

Hollowed portions 23H and 24H (FIG. 7) each having a circular shape are provided at the inner sides of the intermediate portions 23 and 24, respectively. The size (outer diameter) of each of the hollowed portions 23H and 24H is larger than the size (outer diameter) of the disk portion 11 of the electrode 10. The positions of the hollowed portions 23H and 24H correspond to the position of the disk portion 11 of the electrode 10. The hollowed portions 23H and 24H are arranged at positions that are not superimposed on a projected image of the disk portion 11 when the disk portion 11 of the electrode 10 is projected in the direction opposite to the arrow Z (see FIG. 8 and FIG. 10).

Cutout portions 23T and 24T are also provided at the inner sides of the intermediate portions 23 and 24, respectively. The cutout portions 23T and 24T are arranged so as to extend toward the side at which the side surface 42 of the piezoelectric layer 40 is located (toward the direction opposite to the arrow X) from the side at which the hollowed portions 23H and 24H are located, respectively. The positions of the cutout portions 23T and 24T correspond to the position of the extending portion 12 of the electrode 10. As illustrated in FIG. 7 and FIG. 9, end portions of the intermediate portions 23 and 24 in the direction opposite to the arrow X are connected to the side wall portion 21. On the other hand, end portions of the intermediate portions 23 and 24 in the arrow X direction are not connected to a side wall portion 31 of the electrode 30, which will be described later, and are separated from the side wall portion 31.

As illustrated in FIG. 3, the electrode 20 and the FPC 80 (wiring pattern 82) are electrically connected on a portion (connecting place 20C) between the wiring pattern 82 provided in the FPC 80 and the upper surface portion 22 of the electrode 20 (also see FIG. 4 and FIG. 5). The electrode 20 functions as a "transmission electrode" in the embodiment.

(Electrode 30 (Common Electrode, Common Bus))

The electrode 30 as a common electrode includes the side wall portion 31, an upper surface portion 32, an intermediate layer or portion 33, and a lower surface portion 34 (see FIG. 7). Each of the side wall portion 31, the upper surface portion 32, the intermediate portion 33, and the lower surface portion 34 has a plate-like shape. The side wall portion 31 is arranged so as to oppose the side surface 44 (FIG. 5) of the piezoelectric layer 40 and make contact with the side surface 44. The side wall portion 31 has a surface shape covering the overall side surface 44 of the piezoelectric layer 40 (see FIG. 3, FIG. 4, FIG. 9, and FIG. 10). The lower surface portion 34 opposes the lower surface 46 of the piezoelectric layer 40 and makes contact with the lower surface 46. The lower surface portion 34 has a surface shape covering the overall lower surface 46 of the piezoelectric layer 40.

The upper surface portion 32 is provided being continuously connected to an end portion of the side wall portion 31 at the arrow Z direction side and is arranged on the upper surface 41 of the piezoelectric layer 40. When a dimension in the arrow Y direction is assumed to be "width", the upper surface portion 32 has the width equal to that of the upper surface 41 of the piezoelectric layer 40. Both the end portions of the upper surface portion 32 in the arrow Y direction and the respective side surfaces 43 and 45 of the piezoelectric layer 40 have relations of being flush with each other.

Preferably, the upper surface portion 32, the intermediate portion 33, and the lower surface portion 34 extend in a direction parallel to one another. The intermediate portion 33 and the lower surface portion 34 are located at the opposite direction side to the arrow Z relative to the upper surface portion 32. The intermediate portion 33 is located between the upper surface portion 32 and the lower surface portion 34. The intermediate portion 33 is a section of the electrode 30 which is arranged inside the piezoelectric layer 40, and is not visually recognized in the state in which the piezoelectric element 50 is completed (see FIG. 5).

Hollowed portions 32H and 33H (FIG. 7) each having a circular shape are provided at the inner sides of the upper surface portion 32 and the intermediate portion 33, respectively. The size (outer diameter) of each of the hollowed portions 32H and 33H is larger than the size (outer diameter) of the disk portion 11 of the electrode 10. The positions of the hollowed portions 32H and 33H correspond to the position of the disk portion 11 of the electrode 10. The disk portion 11 of the electrode 10 is arranged at the inner side of the hollowed portion 32H (see FIG. 5). The hollowed portion 33H is arranged at a position that is not superimposed on a projected image of the disk portion 11 when the disk portion 11 of the electrode 10 is projected in the direction opposite to the arrow Z (see FIG. 8 and FIG. 10).

Cutout portions 32T and 33T are also provided at the inner sides of the upper surface portion 32 and the intermediate portion 33, respectively. The cutout portions 32T and 33T are arranged so as to extend toward the side at which the side surface 42 of the piezoelectric layer 40 is located (toward the direction opposite to the arrow X) from the side at which the hollowed portions 32H and 33H are located, respectively. The positions of the cutout portions 32T and 33T correspond to the position of the extending portion 12 of the electrode 10. The extending portion 12 of the electrode 10 is arranged at the inner side of the cutout portion 32T (see FIG. 5). A retracted portion 32F is provided on a portion of the upper surface portion 32 in the direction opposite to the arrow Y. The retracted portion 32F is a section for permitting arrangement of the upper surface portion 22 of the electrode 20.

As illustrated in FIG. 7 and FIG. 9, end portions of the upper surface portion 32, the intermediate portion 33, and the lower surface portion 34 in the arrow X direction are connected to the side wall portion 31. On the other hand, end portions of the upper surface portion 32, the intermediate portion 33, and the lower surface portion 34 in the direction opposite to the arrow X are not connected to the side wall portion 21 of the electrode 20 and are separated from the side wall portion 21.

As illustrated in FIG. 3, the electrode 30 and the FPC 80 (wiring pattern 83) are electrically connected on a portion (connecting place 30C) between the wiring pattern 83 provided in the FPC 80 and the upper surface portion 32 of the electrode 30 (also see FIG. 4 and FIG. 5). The electrode 30 functions as a "common bus" in the embodiment.

In the electrodes 10, 20, and 30 configured as described above, portions (the electrode 10, the side wall portion 21 and the upper surface portion 22 of the electrode 20, and the side wall portion 31, the upper surface portion 32, and the lower surface portion 34 of the electrode 30) provided so as to cover the surfaces of the piezoelectric layer 40 are formed by performing sputtering processing with Ag on the surfaces of the piezoelectric layer 40, for example. The portions provided so as to cover the surfaces of the piezoelectric layer 40 may not be limited to be formed by the sputtering processing and may be formed by pasting Ag in a pressure film form. Furthermore, monel (Cu—Ni) may be provided as an underlayer of Ag.

(Transmission Region and Reception Region)

A transmission region 40N and a reception region 40M are formed in the piezoelectric layer 40 in the embodiment as illustrated in FIG. 8 to FIG. 10. The transmission region 40N has a four-layer structure formed of first piezoelectric layers N1 to N4. Outlined arrows in FIG. 8 to FIG. 10 indicate polarization directions of the respective piezoelectric layers.

The first piezoelectric layers N1 to N4 are produced by interposing the intermediate portion 23 of the electrode 20, the intermediate portion 33 of the electrode 30, and the intermediate portion 24 of the electrode 20 between the four piezoelectric layers made of thin piezoelectric ceramics and having strip shapes, laminating them, and integrally baking the laminated body. The first piezoelectric layers N1 to N4 are laminated in the direction of being distanced from the bottom portion 62 of the case 60 and are electrically connected in parallel by the electrode 20 and the electrode 30.

The reception region 40M has a one-layer structure formed of a second piezoelectric layer M1. The second piezoelectric layer M1 is produced by laminating the four piezoelectric layers made of the thin piezoelectric ceramics and having the strip shapes with no electrode interposed therebetween and integrally baking the laminated body.

The lower surface portion 34 of the electrode 30 has a shape extending over both the transmission region 40N and the reception region 40M. The upper surface portion 22 of the electrode 20 opposes the lower surface portion 34 of the electrode 30 with the transmission region 40N including the first piezoelectric layers N1 to N4 interposed therebetween. The disk portion 11 of the electrode 10 opposes the lower surface portion 34 of the electrode 30 with the reception region 40M including the second piezoelectric layer M1 interposed therebetween. That is to say, a region between the upper surface portion 22 of the electrode 20 and the lower surface portion 34 of the electrode 30 and a region between the upper surface portion 32 of the electrode 30 and the lower surface portion 34 of the electrode 30 in the piezoelectric layer 40 function as the transmission region 40N. On the other hand, a region between the disk portion 11 of the electrode 10 and the lower surface portion 34 of the electrode 30 in the piezoelectric layer 40 functions as the reception region 40M.

As illustrated in FIG. 8 and FIG. 10, the transmission region 40N and the reception region 40M are formed at positions adjacent to each other in the surface direction (X-Y plane direction) of the inner surface 62S of the bottom portion 62 of the case 60. To be more specific, the reception region 40M is provided at a center portion of the piezoelectric layer 40 when seen from the above (when the piezoelectric layer 40 is seen in the direction perpendicular to the inner surface 62S of the bottom portion 62 of the case 60). Although FIG. 8 illustrates the plurality of transmission regions 40N, it should be understood that they are continuously connected to each other and the transmission region 40N is provided on a peripheral portion as an outer side portion relative to the reception region 40M in the radial direction so as to surround the reception region 40M.

(Actions and Effects)

As described above, the conventional ultrasonic sensor has the characteristics that as the number of laminated layers of the piezoelectric element is larger, the sound pressure in the transmission is increased whereas the sensitivity in the reception is decreased. The characteristics are provided because in the conventional multilayer piezoelectric element, a portion of the piezoelectric element which is provided for the transmission and a portion thereof which is provided for the reception, are formed in the same section.

In the exemplary embodiment, the portion (transmission region 40N) of the piezoelectric element 50 that is provided for the transmission and the portion (reception region 40M) thereof which is provided for the reception, are not formed in the same section. The four-layer structure, in which the number of laminated layers is four, is employed for the portion (transmission region 40N) of the piezoelectric element 50 which is provided for the transmission in order to increase the sound pressure in the transmission, whereas the one-layer structure is employed for the portion (reception region 40M) thereof which is provided for the reception. The ultrasonic sensor 100 in the embodiment suppresses lowering in the sensitivity in the reception in comparison with the conventional configuration. Accordingly, it can be said that the ultrasonic sensor 100 in the embodiment has a structure capable of adjusting both the sound pressure in the transmission and the sensitivity in the reception independently of each other.

In the embodiment, the transmission region 40N employs the four-layer structure and the reception region 40M employs the one-layer structure. That is to say, the number of first piezoelectric layers is equal to or larger than the number of second piezoelectric layers. Accordingly, impedance in the transmission region 40N is lower than (different from) impedance in the reception region 40M. Accordingly, it can be said that the piezoelectric element 50 of the ultrasonic sensor 100 optimizes adjustment of each of the sound pressure and the sensitivity and enables sensing to be performed with high accuracy. The following describes the actions and the effects in the embodiment more in detail.

The ultrasonic sensor 100 in the above-described first embodiment can be used particularly effectively under an environment where external noise can be neglected and when circuit noise (internal noise) of the reception amplifier and the like is dominant. To be specific, a distance capable of being detected by the ultrasonic sensor and accuracy thereof depend on a signal to noise ratio (SNR). For increasing the SNR, three methods that include increasing the sound pressure in the transmission, increasing the voltage sensitivity in the reception, and reducing the influence of noise in the reception can be mainly cited.

In order to increase the sound pressure in the transmission, methods that include increasing the size of the piezoelectric element, increasing a piezoelectric constant (d constant) of the piezoelectric element, increasing the number of laminated layers of the piezoelectric element, and the like can be cited. Employment of any of these methods requires larger power consumption even with the same voltage because each of these methods causes the impedance of the piezoelectric element to lower.

In order to increase the voltage sensitivity in the reception, methods that include increasing the thickness of the piezoelectric element, decreasing the size of the piezoelectric element, decreasing the number of laminated layers of the piezoelectric element, and the like can be cited. Employment of any of these methods causes the impedance of the piezoelectric element to increase. Making the impedance of the piezoelectric element smaller and reducing the noise of circuits (internal noise) including the reception amplifier and the like are required in order to reduce the influence of the noise in the reception.

When a single plate-type piezoelectric element formed of a single piezoelectric layer and the multilayer piezoelectric element, as disclosed in Japanese Unexamined Patent Application Publication No. 2002-204497 (Patent Document 1), are compared, the sound pressure in the transmission is lower in the single plate-type piezoelectric element than the multilayer piezoelectric element. This result is obtained because when the same voltage is applied to them, intensity of electric field that is applied to the element is larger in the multilayer piezoelectric element than the single plate-type piezoelectric element and distortion that is generated is also larger in the multilayer piezoelectric element.

The voltage sensitivity in the reception is larger in the single plate-type piezoelectric element than the multilayer piezoelectric element. The distortion of the element when the same sound pressure is input is substantially the same between the single plate-type piezoelectric element and the multilayer piezoelectric element and the total electric charges that are generated by the piezoelectric element are also substantially the same between them. On the other hand, the electrostatic capacity is lower in the single plate-type piezoelectric element than the multilayer piezoelectric element. Therefore, the generated voltage is larger in the single plate-type piezoelectric element than the multilayer piezoelectric element based on a relation of voltage=electric charge/electrostatic capacity. Accordingly, the voltage sensitivity in the reception is larger in the single plate-type piezoelectric element than the multilayer piezoelectric element.

When the external noise is dominant or when the circuit noise (internal noise) of the reception amplifier and the like is sufficiently small, the influence of the noise in the reception is larger in the single plate-type piezoelectric element than the multilayer piezoelectric element (the single plate-type piezoelectric element is weaker against the noise). Most noise that comes into the circuit from the outside gives less influence as the impedance of the circuit is lower. Therefore, the influence of the external noise can be reduced in the multilayer element with low impedance compared to the single plate-type piezoelectric element.

On the other hand, noise that is generated in the circuit causes a problem in the environment capable of neglecting the external noise (when the external noise is not dominant). As main circuit noise (internal noise), voltage noise of the reception amplifier, noise caused by heat generated from a resistor component in the circuit, and the like are included. For the convenience of matching between the sensor and the circuit, as impedance of the sensor is lower, the resistor component in the circuit is lower and the noise caused by the heat can therefore be reduced. It should be noted that when the noise caused by the heat is smaller than the voltage noise of the reception amplifier, the total noise is not reduced even by reducing the noise caused by the heat. Accordingly, when the circuit noise is sufficiently small, the sound pressure is higher in the multilayer piezoelectric element than the single plate-type piezoelectric element whereas the voltage sensitivity is lower in the multilayer piezoelectric element. In this case, noise is small in the multilayer piezoelectric element and the SNR therefore becomes higher.

However, when the voltage noise of the reception amplifier is not sufficiently small (the circuit noise of the reception amplifier and the like is dominant) in the environment capable of neglecting the external noise as described above, even if the impedance is lowered by employing the multilayer piezoelectric element, noise cannot be reduced. Therefore, effects of the improvement in the sound pressure and the lowering in the sensitivity undesirably cancel each other. Due to this, it is difficult to sufficiently improve the performance in some cases even when the multilayer piezoelectric element is employed.

On the other hand, in consideration of the actual circumstance under which the ultrasonic sensor 100 is practically mounted, the external noise can be reduced to such level that it can be almost neglected when a shield (electrostatic shield) provided around the circuit is sufficiently ensured. Furthermore, an amplifier with smaller noise needs to be used in order to sufficiently reduce the noise of the reception amplifier. However, this increases the manufacturing cost and therefore such amplifier cannot be easily employed. Accordingly, the ultrasonic sensor 100 in the above-described first embodiment can particularly perform sensing with high accuracy at low cost under the environment where the external noise can be neglected and when the circuit noise (internal noise) of the reception amplifier and the like is dominant as described above. Therefore, the ultrasonic sensor 100 can be used effectively in such a case.

In the embodiment, the number of first piezoelectric layers is equal to or larger than the number of second piezoelectric layers. The configuration is not limited thereto. The number of second piezoelectric layers may be equal to or larger than the number of first piezoelectric layers as long as the impedance between the transmission electrode (electrode 20) and the common bus (electrode 30) is lower than the impedance between the reception electrode (electrode 10) and the common bus (electrode 30).

[Second Embodiment]

Figure 11:
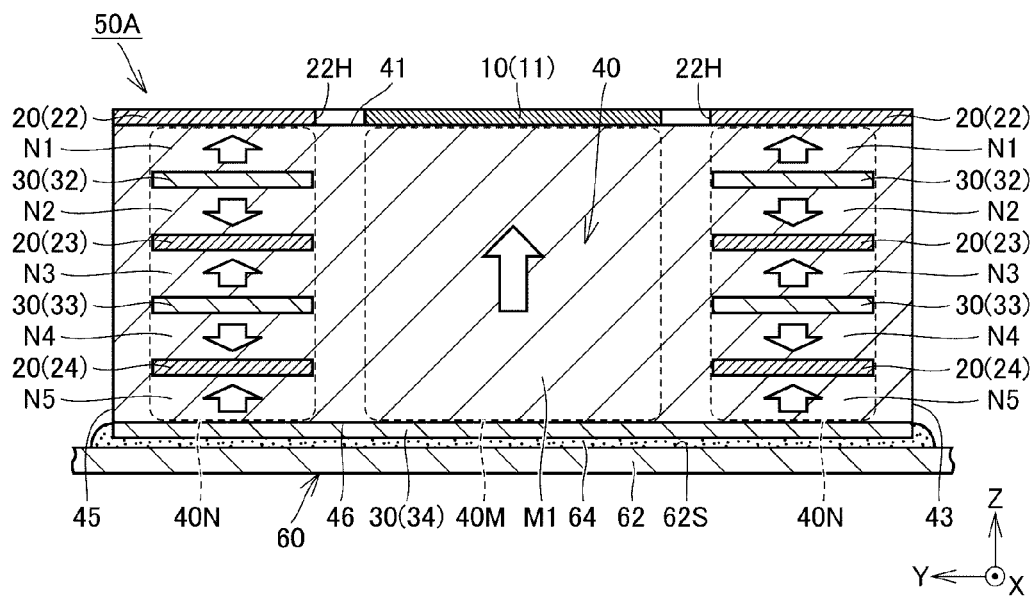
FIG. 11 is a cross-sectional view illustrating a piezoelectric element included in an ultrasonic sensor in a second embodiment.

A piezoelectric element 50A included in an ultrasonic sensor in the embodiment will be described with reference to FIG. 11. FIG. 11 is a cross-sectional view illustrating the piezoelectric element 50A and corresponds to FIG. 8 in the first embodiment.

In the piezoelectric element 50A, the transmission region 40N has a five-layer structure formed of five first piezoelectric layers N1 to N5. As an electrode structure related to the transmission region 40N, the upper surface portion 22 of the electrode 20, the upper surface portion 32 of the electrode 30, the intermediate portion 23 of the electrode 20, the intermediate portion 33 of the electrode 30, the intermediate portion 24 of the electrode 20, and the lower surface portion 34 of the electrode 30 are arranged in this order from the upper side on the paper plane of FIG. 11. With this configuration, actions and effects similar to those obtained in the above-described first embodiment can be obtained.

Although the transmission region 40N has the layer structure formed of four or five first piezoelectric layers in the above-described embodiments, the layer structure thereof is not limited thereof. For example, the transmission region 40N may have a layer structure formed of two, three, or equal to or more than six first piezoelectric layers.

[Third Embodiment]

Figure 12:
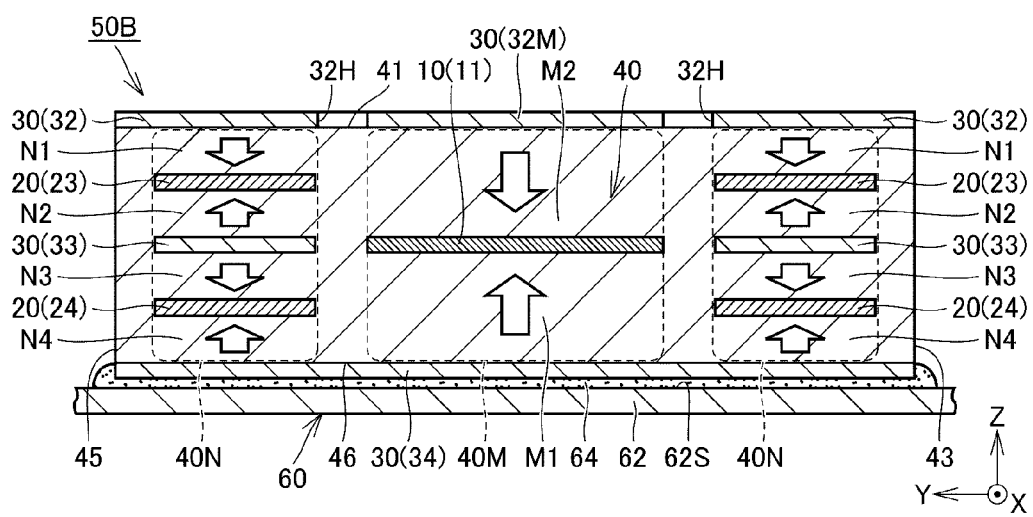
FIG. 12 is a cross-sectional view illustrating a piezoelectric element included in an ultrasonic sensor in a third embodiment.

A piezoelectric element 50B included in an ultrasonic sensor in the embodiment will be described with reference to FIG. 12. FIG. 12 is a cross-sectional view illustrating the piezoelectric element 50B and corresponds to FIG. 8 in the first embodiment.

In the piezoelectric element 50B, the reception region 40M has a two-layer structure formed of two second piezoelectric layers M1 and M2. As an electrode structure related to the reception region 40M, an upper surface portion 32M of the electrode 30, the disk portion 11 of the electrode 10, and the lower surface portion 34 of the electrode 30 are arranged in this order from the upper side on the paper plane of FIG. 12. With this configuration, actions and effects similar to those obtained in the above-described first embodiment can be obtained.

[Fourth Embodiment]

Figure 13:
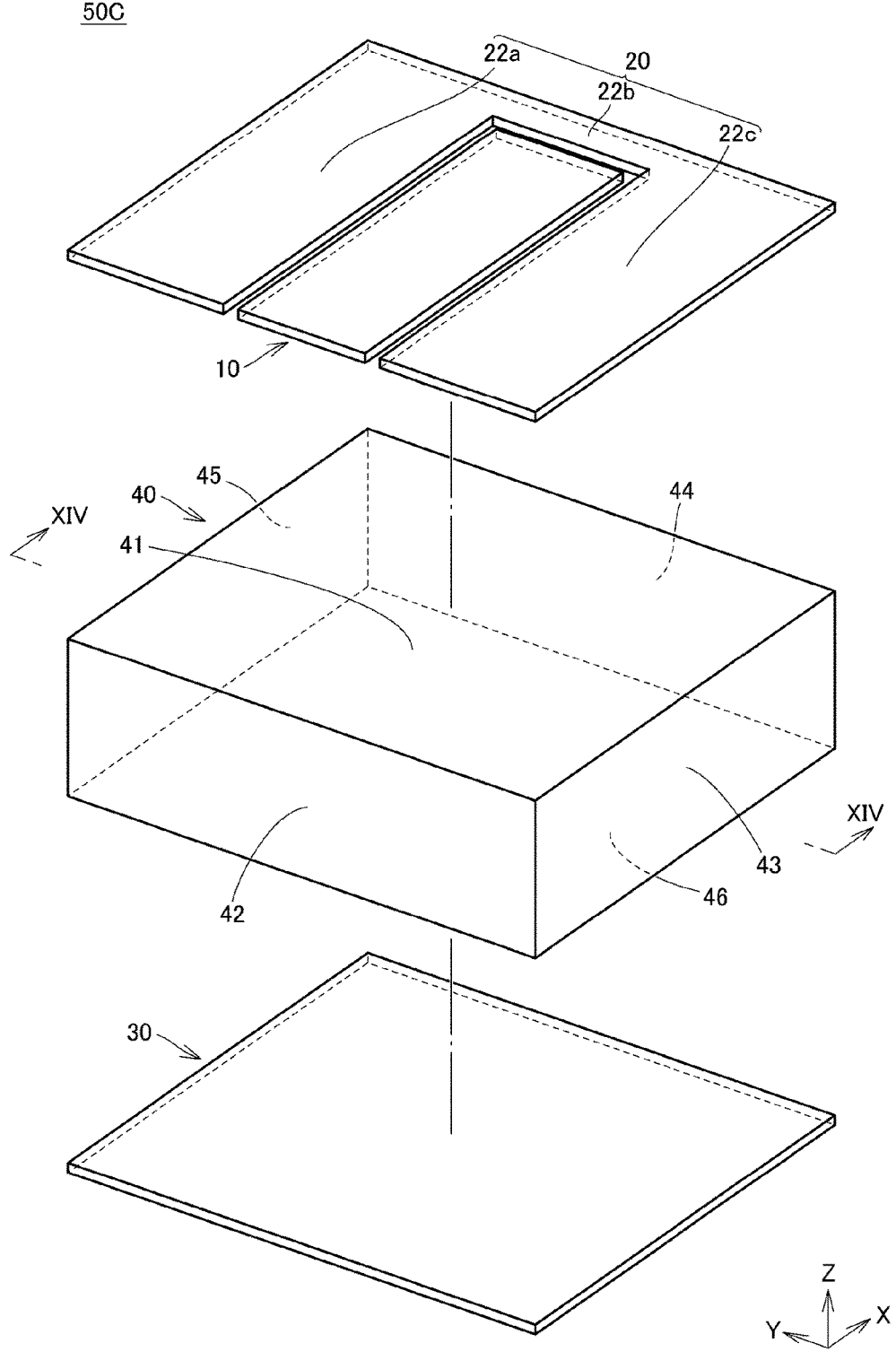
FIG. 13 is a perspective view illustrating an exploded state of a piezoelectric element included in an ultrasonic sensor in a fourth embodiment.
Figure 14:
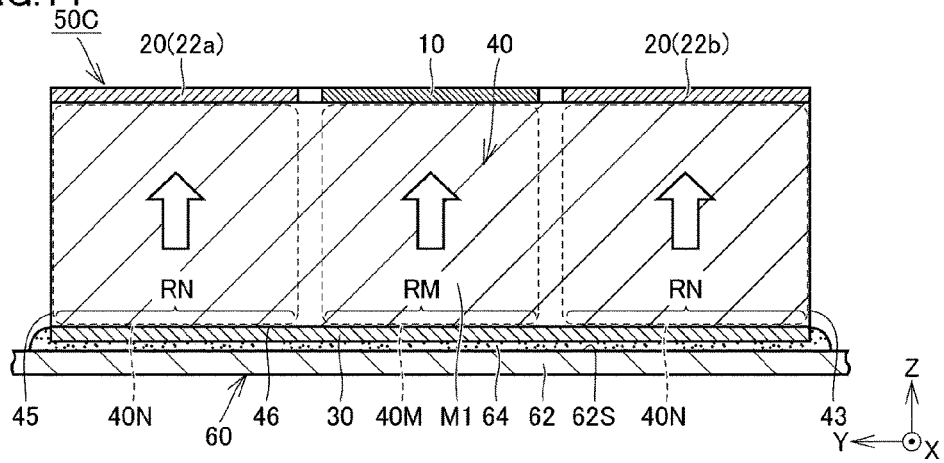
FIG. 14 is a cross-sectional view (assembly view) when seen in an arrow direction along a line XIV-XIV in FIG. 13.

A piezoelectric element 50C included in an ultrasonic sensor in the embodiment will be described with reference to FIG. 13 and FIG. 14. FIG. 13 is a perspective view illustrating an exploded state of the piezoelectric element 50C. FIG. 14 is a cross-sectional view when seen in an arrow direction along a line XIV-XIV in FIG. 13 and illustrates a cross-sectional view in a state in which the piezoelectric element 50C is assembled (FIG. 4 corresponds to FIG. 8 in the first embodiment).

In the piezoelectric element 50C, the piezoelectric layer 40 has a rectangular parallelepiped shape. The electrodes 10 and 30 have rectangular flat-plate outer shapes. The electrode 20 has extending portions 22a and 22c and a connecting portion 22b connecting them. The electrode 10 is arranged between the extending portion 22a and the extending portion 22c. As illustrated in FIG. 14, the transmission region 40N has a one-layer structure formed of a single first piezoelectric layer N1 and the reception region 40M also has a one-layer structure formed of a single second piezoelectric layer M1.

In the embodiment, a surface area (total area) RN of a surface of the transmission region 40N at the side bonded to the inner surface 62S of the bottom portion 62 of the case 60 is preferably equal to or larger than (to be specific, larger than) a surface area (total area) RM of a surface of the reception region 40M at the side bonded to the inner surface 62S of the bottom portion 62 of the case 60. With this configuration, impedance (of the transmission region 40N) between the electrode 20 (the extending portions 22a and 22c) and the electrode 30 is lower than (different from) impedance (of the reception region 40M) between the electrode 10 and the electrode 30. Therefore, actions and effects similar to those obtained in the above-described first embodiment can be obtained. It can be considered that the ultrasonic sensor including the piezoelectric element 50C in the embodiment can adjust both the sound pressure in the transmission and the sensitivity in the reception independently of each other and can optimize them.

[Fifth Embodiment]

Figure 15:
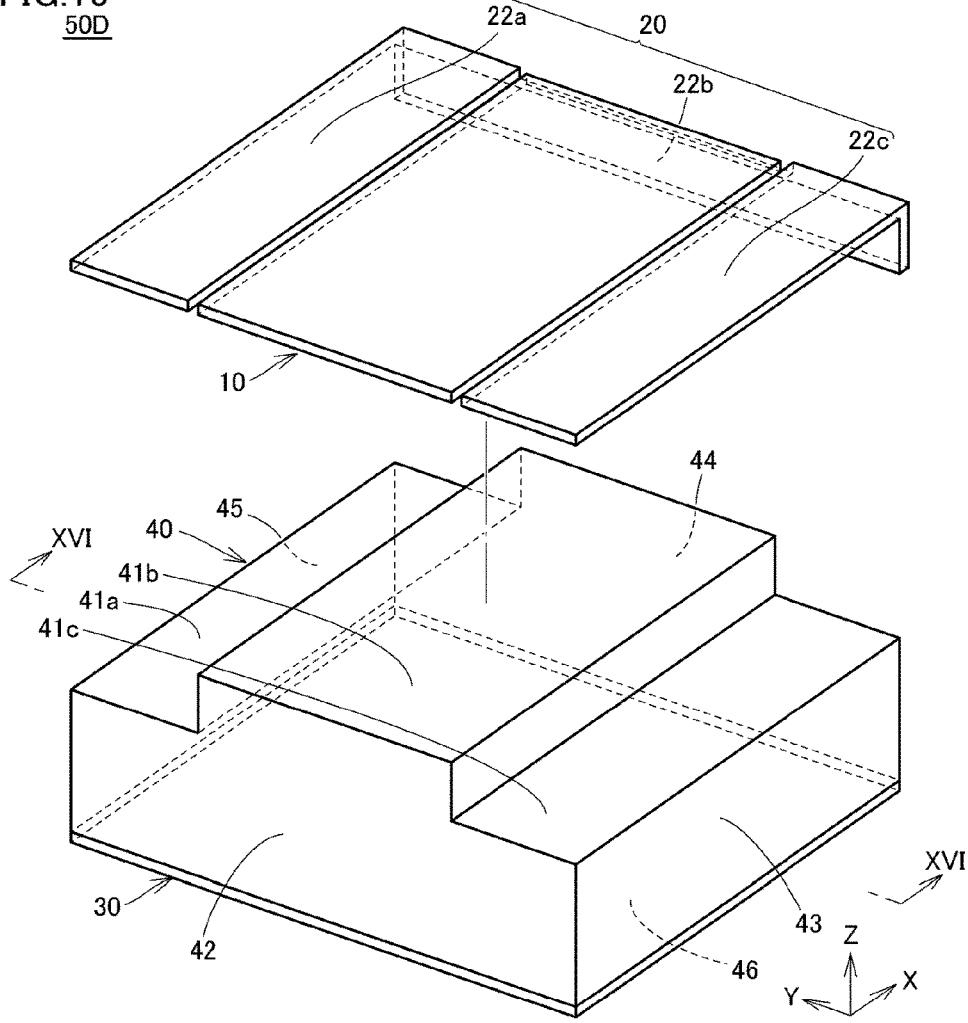
FIG. 15 is a perspective view illustrating an exploded state of a piezoelectric element included in an ultrasonic sensor in a fifth embodiment.
Figure 16:
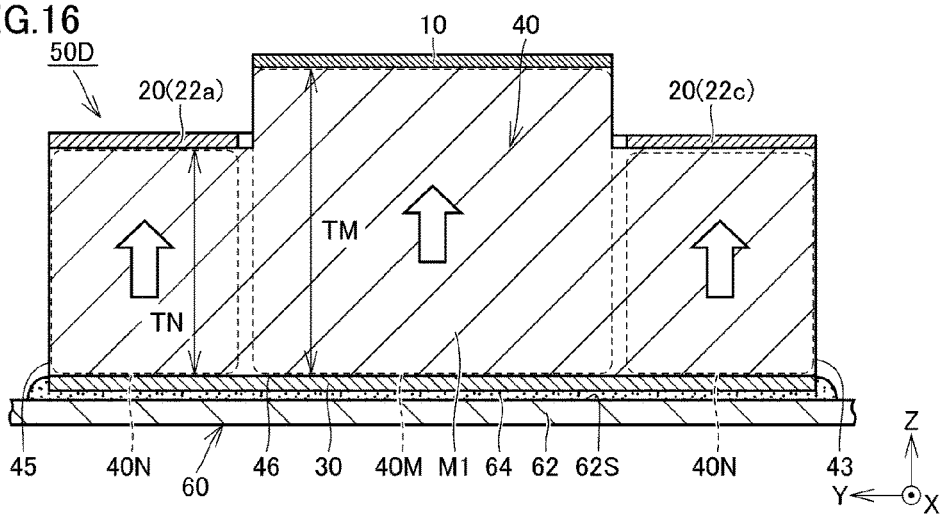
FIG. 16 is a cross-sectional view (assembly view) when seen in an arrow direction along a line XVI-XVI in FIG. 15.

A piezoelectric element 50D included in an ultrasonic sensor in the embodiment will be described with reference to FIG. 15 and FIG. 16. FIG. 15 is a perspective view illustrating an exploded state of the piezoelectric element 50D. FIG. 16 is a cross-sectional view when seen in an arrow direction along a line XVI-XVI in FIG. 15 and illustrates a cross-sectional view in a state in which the piezoelectric element 50D is assembled (FIG. 16 corresponds to FIG. 8 in the first embodiment).

Also in the piezoelectric element 50D, the electrodes 10 and 30 have rectangular flat-plate outer shapes as in the fourth embodiment. The electrode 20 has the extending portions 22a and 22c and the connecting portion 22b connecting them. The electrode 10 is arranged between the extending portion 22a and the extending portion 22c. The piezoelectric layer 40 has upper surfaces 41a and 41c and an upper surface 41b having the thickness larger than those of the upper surfaces 41a and 41c. As illustrated in FIG. 16, the transmission region 40N has a one-layer structure formed of a single first piezoelectric layer N1 and the reception region 40M also has a one-layer structure formed of a single second piezoelectric layer M1. Note that a surface area (total area) of a surface of the transmission region 40N at the side bonded to the inner surface 62S of the bottom portion 62 of the case 60 is substantially the same as a surface area (total area) of a surface of the reception region 40M at the side bonded to the inner surface 62S of the bottom portion 62 of the case 60.

In the embodiment, a thickness TN of the transmission region 40N in the direction orthogonal to the bottom portion 62 of the case 60 is equal to or smaller than a thickness TM of the reception region 40M in the same direction. With this configuration, the impedance (of the transmission region 40N) between the electrode 20 (the extending portions 22a and 22c) and the electrode 30 is lower than (different from) the impedance (of the reception region 40M) between the electrode 10 and the electrode 30. Therefore, actions and effects similar to those obtained in the above-described first embodiment can be obtained. It can be considered that the ultrasonic sensor including the piezoelectric element 50D in the embodiment can adjust both the sound pressure in the transmission and the sensitivity in the reception independently of each other and can optimize them.

[Sixth Embodiment]

Figure 17:
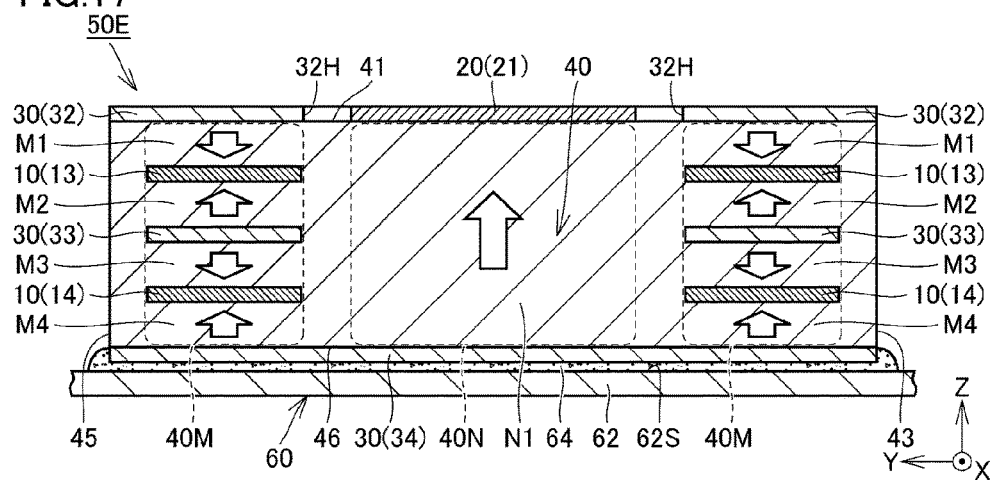
FIG. 17 is a cross-sectional view illustrating a piezoelectric element included in an ultrasonic sensor in a sixth embodiment.

A piezoelectric element 50E included in an ultrasonic sensor in the embodiment will be described with reference to FIG. 17. FIG. 17 is a cross-sectional view illustrating the piezoelectric element 50E and corresponds to FIG. 8 in the first embodiment. In the embodiment, a relation between the transmission region 40N and the reception region 40M is exactly opposite to the relation in the first embodiment.

The transmission region 40N has a one-layer structure formed of a single first piezoelectric layer N1 and the reception region 40M has a four-layer structure formed of four second piezoelectric layers M1 to M4. As an electrode structure related to the reception region 40M, the upper surface portion 32 of the electrode 30, an intermediate portion 13 of the electrode 10, the intermediate portion 33 of the electrode 30, an intermediate portion 14 of the electrode 10, and the lower surface portion 34 of the electrode 30 are arranged in this order from the upper side on the paper plane of FIG. 17. With this configuration, it can be said that both the sound pressure in the transmission and the sensitivity in the reception can be adjusted independently of each other.

[Seventh Embodiment]

Figure 18:
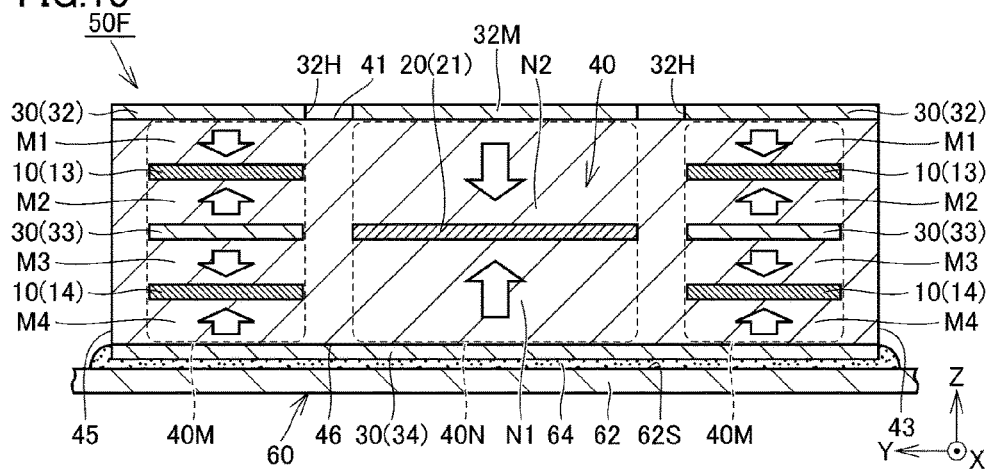
FIG. 18 is a cross-sectional view illustrating a piezoelectric element included in an ultrasonic sensor in a seventh embodiment.

A piezoelectric element 50F included in an ultrasonic sensor in the embodiment will be described with reference to FIG. 18. FIG. 18 is a cross-sectional view illustrating the piezoelectric element 50F and corresponds to FIG. 12 in the third embodiment. In the embodiment, a relation between the transmission region 40N and the reception region 40M is exactly opposite to the relation in the third embodiment.

The transmission region 40N has a two-layer structure formed of two first piezoelectric layers N1 and N2, and the reception region 40M has a four-layer structure formed of four second piezoelectric layers M1 to M4. With this configuration, it can be said that both the sound pressure in the transmission and the sensitivity in the reception can be adjusted independently of each other.

[Eighth Embodiment]

Figure 19:
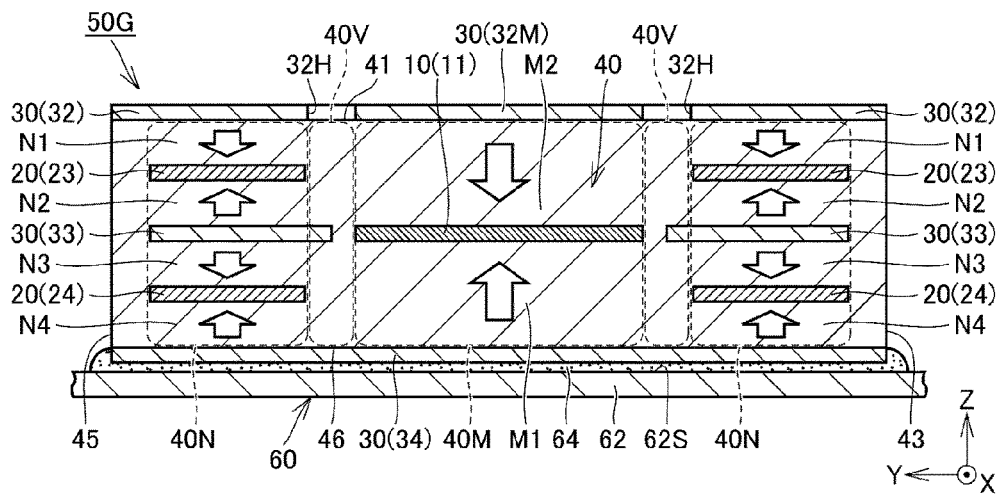
FIG. 19 is a cross-sectional view illustrating a piezoelectric element included in an ultrasonic sensor in an eighth embodiment.

A piezoelectric element 50G included in an ultrasonic sensor in the embodiment will be described with reference to FIG. 19. FIG. 19 is a cross-sectional view illustrating the piezoelectric element 50G and corresponds to FIG. 12 in the third embodiment. In the embodiment, the transmission region 40N, the reception region 40M, and an isolation region 40V are formed in the piezoelectric layer 40 and a part of the electrode 30 (to be specific, a part of the intermediate portion 33 of the electrode 30) is provided so as to extend into the isolation region 40V. The isolation region 40V is a portion (region having an insulating property) of the piezoelectric layer 40, which is located between the transmission region 40N and the reception region 40M. With this configuration, actions and effects similar to those obtained in the above-described first embodiment can be obtained.

[Ninth Embodiment]

Figure 20:
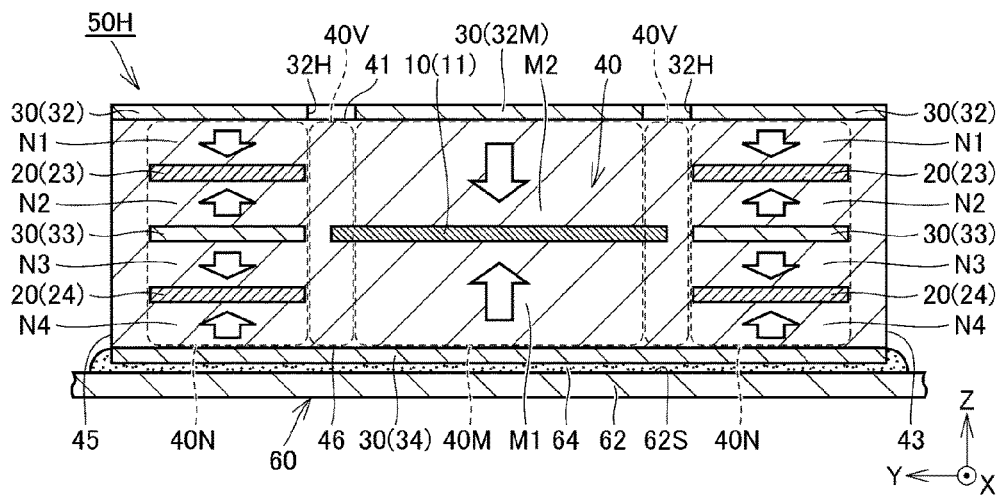
FIG. 20 is a cross-sectional view illustrating a piezoelectric element included in an ultrasonic sensor in a ninth embodiment.

A piezoelectric element 50H included in an ultrasonic sensor in the embodiment will be described with reference to FIG. 20. FIG. 20 is a cross-sectional view illustrating the piezoelectric element 50H and corresponds to FIG. 12 in the third embodiment. In the embodiment, the transmission region 40N, the reception region 40M, and the isolation region 40V are formed in the piezoelectric layer 40 and a part of the electrode 10 is provided so as to extend into the isolation region 40V. With this configuration, actions and effects similar to those obtained in the above-described first embodiment can be obtained.

[Tenth Embodiment]

Figure 21:
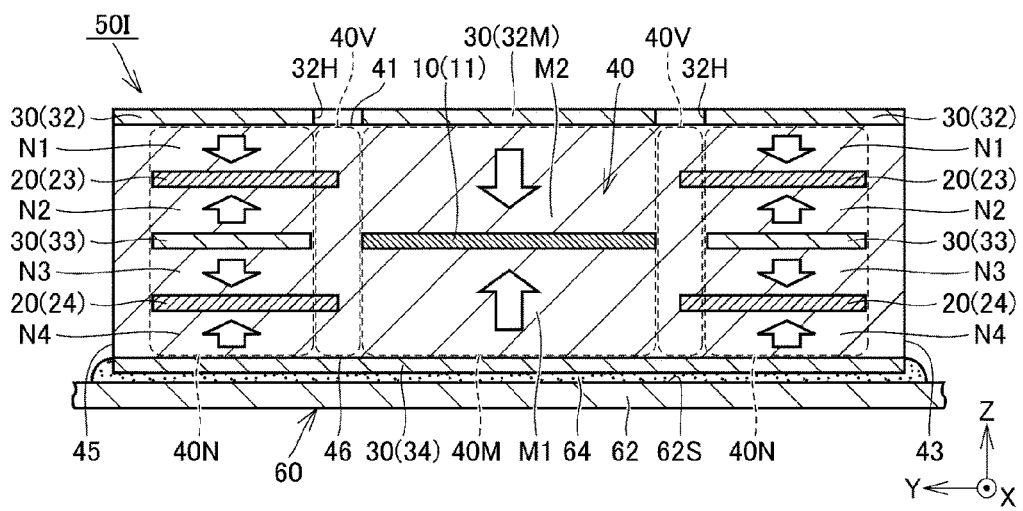
FIG. 21 is a cross-sectional view illustrating a piezoelectric element included in an ultrasonic sensor in a tenth embodiment.

A piezoelectric element 50I included in an ultrasonic sensor in the embodiment will be described with reference to FIG. 21. FIG. 21 is a cross-sectional view illustrating the piezoelectric element 50I and corresponds to FIG. 12 in the third embodiment. In the embodiment, the transmission region 40N, the reception region 40M, and the isolation region 40V are formed in the piezoelectric layer 40 and a part of the electrode 20 (to be specific, a part of the intermediate portion 23 and a part of the intermediate portion 24 of the electrode 20) is provided so as to extend into the isolation region 40V. With this configuration, actions and effects similar to those obtained in the above-described first embodiment can be obtained.

[Eleventh Embodiment]

Figure 22:
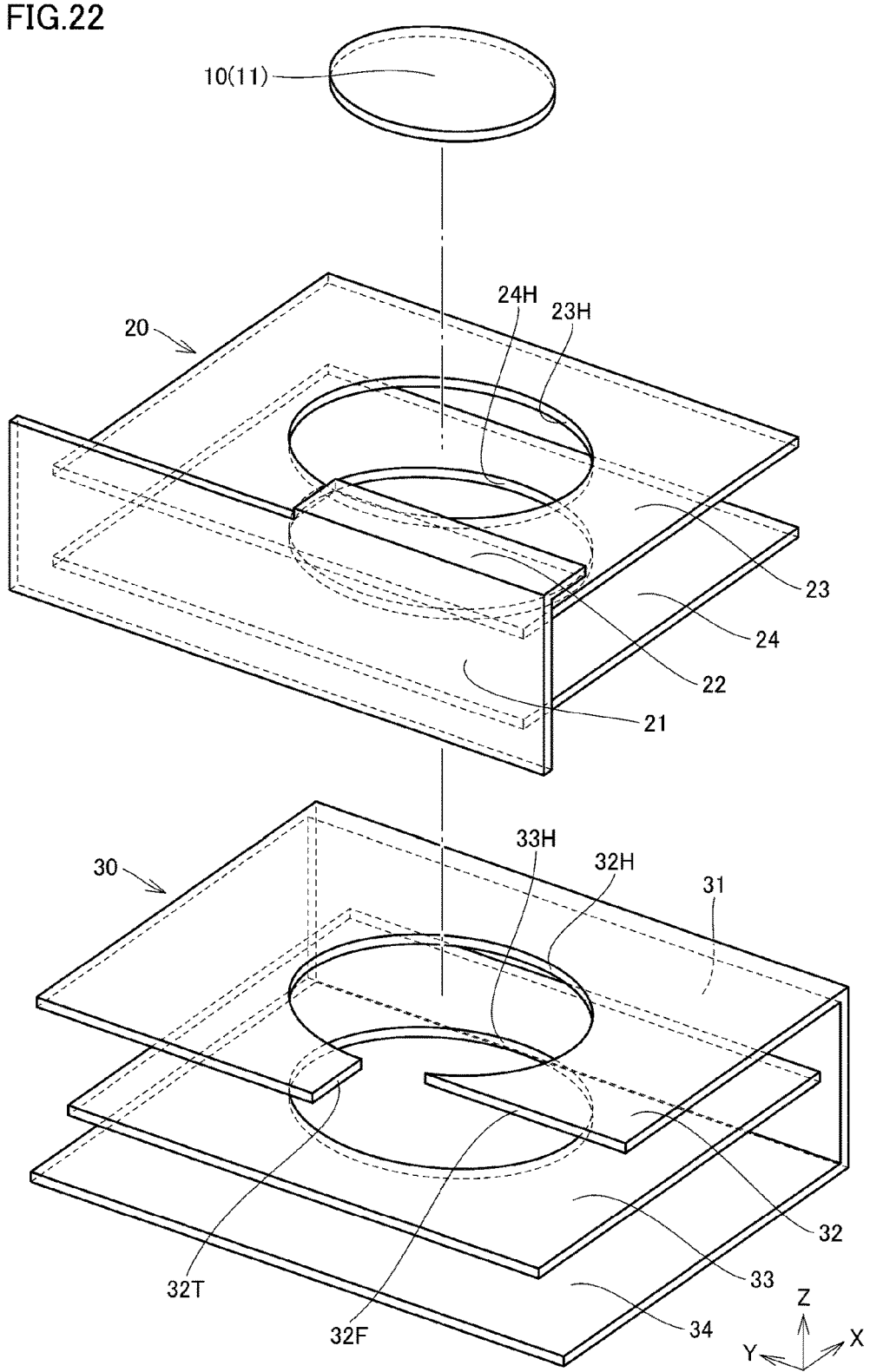
FIG. 22 is a perspective view illustrating electrodes included in a piezoelectric element in an eleventh embodiment.

A piezoelectric element included in an ultrasonic sensor in the embodiment will be described with reference to FIG. 22. FIG. 22 is a perspective view illustrating the electrodes 10, 20, and 30 included in the piezoelectric element in the embodiment and corresponds to FIG. 7 in the first embodiment.

In the embodiment, the electrode 10 includes the disk portion 11 and does not include the extending portion 12. The electrode 10 has a disk-like shape as a whole. Furthermore, the intermediate portions 23 and 24 of the electrode 20 and the intermediate portion 33 of the electrode 30, i.e., the portions of the electrode 20 that are not sandwiched between the first piezoelectric layers and a portion of the electrode 30 that is not sandwiched between the second piezoelectric layers (hereinafter, they are collectively referred to as inner electrodes), have ring-like shapes.

With this configuration, actions and effects similar to those obtained in the above-described first embodiment can be obtained. Furthermore, with this configuration, the intermediate portions 23 and 24 of the electrode 20 and the intermediate portion 33 of the electrode 30 have the ring-like shapes. Therefore, even when impact is applied to the case 60 (see FIG. 2) from the outside and cracks are generated in a part of the intermediate portions 23 and 24 of the electrode 20 or the intermediate portion 33 of the electrode 30, a decrease in a range of the electrodes contributing to the driving can be prevented. Accordingly, chipping resistance can be improved. It should be noted that the exemplary embodiment is not limited to the configuration in which all the three intermediate portions 23, 24, and 33 have the ring-like shapes and any one or two of the intermediate portions 23, 24, and 33 may be configured to have the ring-like shape(s).

[Twelfth Embodiment]

Figure 23:
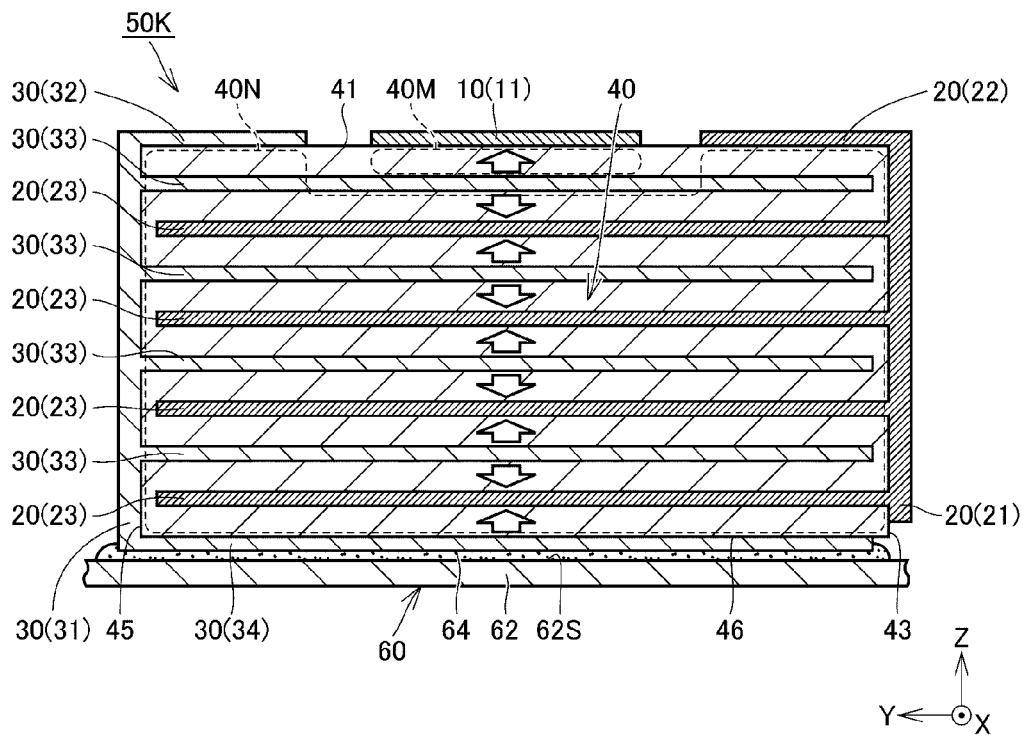
FIG. 23 is a cross-sectional view illustrating a piezoelectric element included in an ultrasonic sensor in a twelfth embodiment.

A piezoelectric element 50K included in an ultrasonic sensor in the embodiment will be described with reference to FIG. 23. FIG. 23 is a cross-sectional view illustrating the piezoelectric element 50K and corresponds to FIG. 9 in the first embodiment. In the piezoelectric element 50K, the upper surface portion 22 of the electrode 20 and the upper surface portion 32 of the electrode 30 are formed on the upper surface 41 of the piezoelectric layer 40, and the electrode 10 is provided between the upper surface portion 22 and the upper surface portion 32. The electrodes 20 and 30 include a plurality of intermediate portions 23 and 33 and the plurality of intermediate portions 23 and 33 are alternately aligned in the thickness direction of the piezoelectric layer 40.

In the embodiment, the reception region 40M is formed between the electrode 10 and the intermediate portion 33 of the electrode 30, which is located at the uppermost stage. The transmission region 40N is formed in a portion in which the electrode 20 and the electrode 30 oppose each other. In the embodiment, the reception region 40M and the transmission region 40N are formed at positions adjacent to each other in the direction perpendicular to the inner surface 62S of the bottom portion 62 of case 60.

With this configuration, actions and effects similar to those obtained in the above-described first embodiment can be obtained. Furthermore, with the configuration, a region per volume, which is used for the transmission, is increased in comparison with the case in which the reception region 40M and the transmission region 40N are formed at the positions adjacent to each other in the surface direction of the inner surface 62S of the bottom portion 62 of case 60, thereby improving the sound pressure.

[Thirteenth Embodiment]

Figure 24:
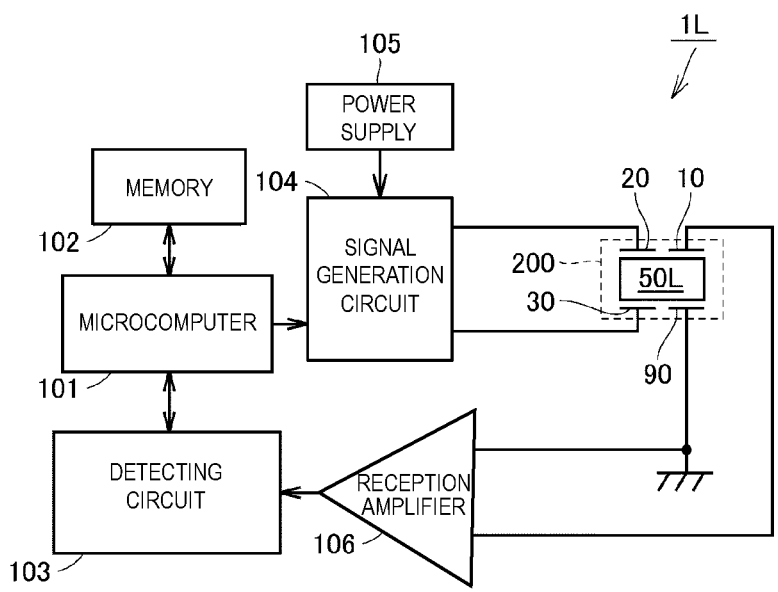
FIG. 24 is a diagram illustrating functional blocks of a sensor device including an ultrasonic sensor in a thirteenth embodiment.

An ultrasonic sensor 200 in the embodiment will be described with reference to FIG. 24 to FIG. 26. FIG. 24 is a diagram illustrating functional blocks of a sensor device 1L including the ultrasonic sensor 200 and corresponds to FIG. 1 in the first embodiment. The sensor device 1L includes, in addition to the ultrasonic sensor 200, the microcomputer 101, the memory 102, the detecting circuit 103, the signal generation circuit 104, the power supply 105, and the reception amplifier 106. As will be described in detail later, the ultrasonic sensor 200 includes a piezoelectric element 50L, and the piezoelectric element 50L has a four-terminal structure formed of electrodes 10, 20, 30, and 90. The electrodes 20 and 30 are connected to the signal generation circuit 104. The electrode 10 is connected to the reception amplifier 106 and the electrode 90 is grounded.

(Piezoelectric Element 50L)

The piezoelectric element 50L included in the ultrasonic sensor 200 will be described with reference to FIG. 25 and FIG. 26. FIG. 25 is a perspective view illustrating the piezoelectric element 50L and corresponds to FIG. 5 in the first embodiment. FIG. 26 is a cross-sectional view when seen in an arrow direction along a line XXVI-XXVI in FIG. 25 and corresponds to FIG. 9 in the first embodiment.

The piezoelectric element 50L in the embodiment is mounted in the case 60 (see FIG. 2) in the same manner as the piezoelectric element 50 in the above-described first embodiment. To be specific, the ultrasonic sensor 200 in the embodiment includes the case 60 (FIG. 2) having the bottom portion 62 and the piezoelectric element 50L that is bonded to the inner surface 62S of the bottom portion 62 and performs bending vibration together with the bottom portion 62.

(Piezoelectric Element 50L)

Figure 25:
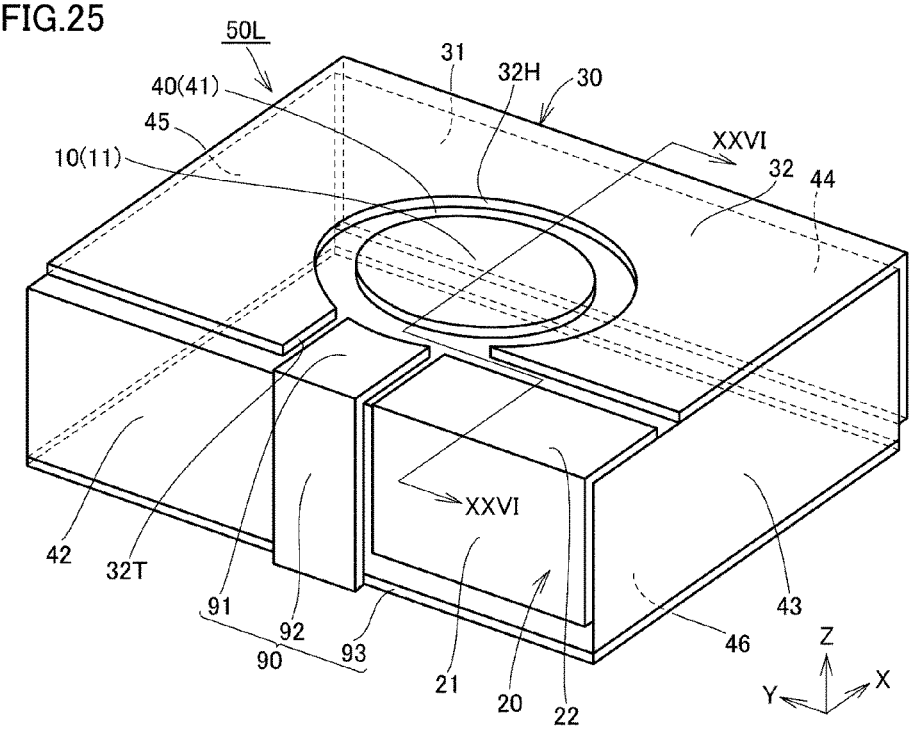
FIG. 25 is a perspective view illustrating a piezoelectric element included in the ultrasonic sensor in the thirteenth embodiment.
Figure 26:
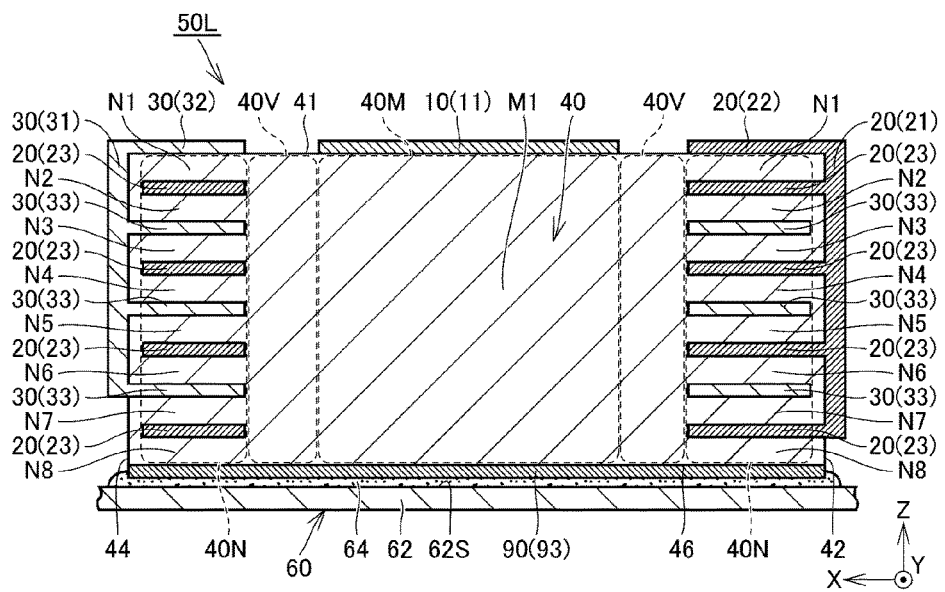
FIG. 26 is a cross-sectional view (assembly view) when seen in an arrow direction along a line XXVI-XXVI in FIG. 25.

As illustrated in FIG. 24 to FIG. 26, the piezoelectric element 50L includes the piezoelectric layer 40, the electrodes 10, 20, and 30, and the electrode 90 (ground electrode) as a common electrode. The piezoelectric layer 40 has a substantially rectangular parallelepiped shape in the same manner as in the above-described first embodiment. FIG. 26 illustrates the upper surface 41, the side surface 42, and the side surface 44.

The electrode 10 (reception electrode) is formed on the upper surface 41 of the piezoelectric layer 40. The electrode 10 in the embodiment is configured with the disk portion 11 and does not include the extending portion 12 (see FIG. 7).

The electrode 20 (transmission electrode) includes the side wall portion 21, the upper surface portion 22, and the plurality of intermediate portions 23 (FIG. 26). The side wall portion 21 opposes the side surface 42 of the piezoelectric layer 40 and makes contact with the side surface 42. The upper surface portion 22 is provided being continuously connected to an end portion of the side wall portion 21 at the arrow Z direction side, and is arranged on the upper surface 41 of the piezoelectric layer 40. The plurality of intermediate portions 23 are sections (inner electrodes) of the electrode 20 which are arranged inside the piezoelectric layer 40, and are not visually recognized in a state in which the piezoelectric element 50L is completed. The intermediate portions 33 of the electrode 30 are arranged between the plurality of intermediate portions 23.

In the embodiment, the electrode 30 also functions as a transmission electrode. The electrode 30 includes the side wall portion 31, the upper surface portion 32, and the plurality of intermediate portions 33 (FIG. 26). The side wall portion 31 opposes the side surface 44 of the piezoelectric layer 40 and makes contact with the side surface 44. The upper surface portion 32 is provided being continuously connected to an end portion of the side wall portion 31 at the arrow Z direction side, and is arranged on the upper surface 41 of the piezoelectric layer 40. The plurality of intermediate portions 33 are sections (inner electrodes) of the electrode 30 which are arranged inside the piezoelectric layer 40, and are not visually recognized in the state in which the piezoelectric element 50L is completed. The intermediate portions 23 of the electrode 20 are arranged between the plurality of intermediate portions 33.

As described above, the electrode 90 (ground electrode) is grounded to a GND potential. The electrode 90 in the embodiment includes an upper surface portion 91, a side wall portion 92, and a lower surface portion 93. The side wall portion 92 opposes the side surface 42 of the piezoelectric layer 40 and makes contact with the side surface 42. The upper surface portion 91 is provided being continuously connected to an end portion of the side wall portion 92 at the arrow Z direction side, and is arranged on the upper surface 41 of the piezoelectric layer 40. The lower surface portion 93 is provided being continuously connected to an end portion of the side wall portion 92 at the side opposite to the arrow Z, and is arranged on the lower surface 46 of the piezoelectric layer 40.

(Transmission Region and Reception Region)

The transmission region 40N, the reception region 40M, and the isolation region 40V are formed in the piezoelectric layer 40 as illustrated in FIG. 26. The number of layers including one or a plurality of unit piezoelectric layers forming the transmission region 40N and the number of layers including one or a plurality of unit piezoelectric layers forming the reception region 40M are made to be different from each other. In the embodiment, the transmission region 40N has an eight-layer structure formed of first piezoelectric layers N1 to N8. On the other hand, the reception region 40M has a one-layer structure formed of the second piezoelectric layer M1.

The first piezoelectric layers N1 to N8 are laminated in the direction of being distanced from the bottom portion 62 of the case 60 (FIG. 2). Moreover, the first piezoelectric layers N1 to N8 are electrically connected in parallel by the upper surface portion 22 and the intermediate portions 23 of the electrode 20 (transmission electrode) and the upper surface portion 32 and the intermediate portions 33 of the electrode 30 (transmission electrode).

The electrode 90 (ground electrode) has a shape extending over both the transmission region 40N and the reception region 40M that are adjacent to each other with the isolation region 40V interposed therebetween. The upper surface portion 22 of the electrode 20 opposes the lower surface portion 93 of the electrode 90 with the transmission region 40N including the first piezoelectric layers N1 to N8 interposed therebetween. The electrode 10 opposes the lower surface portion 93 of the electrode 90 with the reception region 40M including the second piezoelectric layer M1 interposed therebetween. The electrode 90 may not include the upper surface portion 91 and the side wall portion 92 as long as it opposes at least the reception region 40M with the piezoelectric layer 40 interposed therebetween.

In the embodiment, a region of the piezoelectric layer 40 which is located between the upper surface portion 22 of the electrode 20 and the electrode 20 (intermediate portions 23) sandwiched between the piezoelectric layers N7 and N8, a region thereof which is located between the intermediate portions 23 of the electrode 20 and the upper surface portion 32 of the electrode 30, and a region thereof which is located between the upper surface portion 32 of the electrode 30 and the electrode 20 (intermediate portion 23) sandwiched between the piezoelectric layers N7 and N8, function as the transmission region 40N. A region thereof which is located between the electrode 10 and the lower surface portion 93 of the electrode 90 functions as the reception region 40M.

The transmission region 40N and the reception region 40M are formed at positions adjacent to each other with the isolation region 40V (insulating region) interposed therebetween in the surface direction (X-Y plane direction) of the inner surface 62S of the bottom portion 62 of the case 60. To be specific, the reception region 40M is provided at a center portion of the piezoelectric layer 40. Although FIG. 26 illustrates the plurality of transmission regions 40N, they are continuously connected to each other and the transmission region 40N is provided on a peripheral portion as an outer side portion relative to the reception region 40M in the radial direction so as to surround the reception region 40M.

With this configuration, actions and effects similar to those obtained in the above-described first embodiment can be obtained. The electrode 90 is separated from the electrode 30 and the electrode 90 is grounded. Therefore, even when static electricity enters through the case 60, electric charges are immediately discharged to the GND potential, thereby preventing the signal generation circuit 104, the reception amplifier 106, and so on from being broken. Furthermore, the case 60 has the GND potential stably, thereby suppressing electromagnetic noise.

[Other Embodiments]

Although the piezoelectric element is made of PZT-based ceramics in each of the above-described embodiments, the piezoelectric element is not limited to be made thereof. For example, the piezoelectric element may be made of a piezoelectric material of non-lead-based piezoelectric ceramics such as potassium sodium niobate-based ceramics, alkali niobate-based ceramics, or the like. Although the silicones 71 and 72 are made of silicone resin in each of the above-described embodiments, the silicones 71 and 72 are not limited to be made thereof. For example, the silicones 71 and 72 may be made of urethane resin or silicone foam resin as long as they are made of resin. The outer shape of the piezoelectric element is a substantially rectangular parallelepiped shape in each of the above-described embodiments, the outer shape of the piezoelectric element is not limited thereto. For example, actions and effects similar to those obtained in the above-described first embodiment can be obtained even when the outer shape of the piezoelectric element is a cylindrical shape.

Although the respective embodiments according to the present invention have been described above, the contents disclosed above are not limiting but illustrative in all points.

REFERENCE SIGNS LIST 1, 1L SENSOR DEVICE
10 ELECTRODE (RECEPTION ELECTRODE)
10C, 20C, 30C CONNECTING PLACE
11 DISK PORTION
12, 22a, 22c EXTENDING PORTION
13, 14, 23, 24, 33 INTERMEDIATE PORTION
20 ELECTRODE (TRANSMISSION ELECTRODE)
21, 31, 92 SIDE WALL PORTION
22, 32, 32M, 91 UPPER SURFACE PORTION
22b CONNECTING PORTION
23H, 24H, 32H, 33H HOLLOWED PORTION
23T, 24T, 32T, 33T CUTOUT PORTION
30 ELECTRODE (COMMON BUS, COMMON ELECTRODE)
32F RETRACTED PORTION
34, 93 LOWER SURFACE PORTION
40 PIEZOELECTRIC LAYER
40M RECEPTION REGION
40N TRANSMISSION REGION
40V ISOLATION REGION
41, 41a, 41b, 41c UPPER SURFACE
42, 43, 44, 45 SIDE SURFACE
46 LOWER SURFACE
50, 50A, 50B, 50C, 50D, 50E, 50F, 50G, 50H, 50I, 50K, 50L PIEZOELECTRIC ELEMENT
60 CASE
61 CYLINDRICAL PORTION
62 BOTTOM PORTION
62S INNER SURFACE
62T OUTER SURFACE
63 SOUND ABSORBING MATERIAL
64 ADHESIVE
65 BONDING AGENT
71, 72 SILICONE
80T LEADING END PORTION
81, 82, 83 WIRING PATTERN
90 ELECTRODE (GROUND ELECTRODE, COMMON ELECTRODE)
100, 200 ULTRASONIC SENSOR
101 MICROCOMPUTER
102 MEMORY
103 DETECTING CIRCUIT
104 SIGNAL GENERATION CIRCUIT
105 POWER SUPPLY
106 RECEPTION AMPLIFIER
M1, M2, M3, M4 SECOND PIEZOELECTRIC LAYER
N1, N2, N3, N4, N5 FIRST PIEZOELECTRIC LAYER
TM, TN THICKNESS
X, Y, Z ARROW

The invention claimed is:

1. An ultrasonic sensor comprising:
a case having a bottom portion; and
a piezoelectric element bonded to an inner surface of the bottom portion, the piezoelectric element including:
a piezoelectric layer having a transmission region and a reception region;
a common electrode having at least one portion facing or disposed within both the transmission region and reception region of the piezoelectric layer;
a transmission electrode opposed to the common electrode with the transmission region interposed therebetween; and
a reception electrode opposed to the common electrode with the reception region interposed therebetween, wherein an impedance between the transmission electrode and the common electrode is lower than an impedance between the reception electrode and the common electrode.

2. The ultrasonic sensor according to claim 1, wherein the reception electrode comprises at least one disk and the transmission electrode comprises a plurality of intermediate portions disposed in the transmission region of the piezoelectric layer, wherein the number of intermediate portions is greater than the number of the at least one disk.

3. The ultrasonic sensor according to claim 1, wherein the transmission region and the reception region are arranged at positions adjacent to each other in a direction perpendicular to the inner surface of the bottom portion.

4. The ultrasonic sensor according to claim 1, wherein the transmission region and the reception region are arranged at positions adjacent to each other in a direction parallel to the inner surface of the bottom portion.

5. The ultrasonic sensor according to claim 1, wherein the reception region is disposed at a center portion of the piezoelectric element in a planar view of the ultrasonic sensor, and the transmission region is disposed on a peripheral portion of the piezoelectric element relative to the reception region in a radial direction.

6. The ultrasonic sensor according to claim 5, wherein the transmission region surrounds the reception region.

7. The ultrasonic sensor according to claim 5,
wherein the transmission electrode comprises at least one inner electrode that is laminated in a direction of being distanced from the bottom portion, and
wherein the at least one inner electrode comprises a ring-like shape that is arranged on the peripheral portion of the piezoelectric element.

8. The ultrasonic sensor according to claim 1, wherein the common electrode is a common bus having a shape extending over both the transmission region and the reception region in a planar view of the ultrasonic sensor.

9. The ultrasonic sensor according to claim 2,
wherein the transmission region of the piezoelectric layer includes a plurality of first piezoelectric layers electrically connected in parallel and that are laminated in a direction being distanced from the bottom portion so as to be interposed, respectively, between the plurality of intermediate portions of the transmission electrode, and wherein the reception region of the piezoelectric layer includes one second piezoelectric layer disposed between the common electrode and the reception electrode.

10. The ultrasonic sensor according to claim 2, wherein the transmission region of the piezoelectric layer includes a plurality of first piezoelectric layers electrically connected in parallel and that are laminated in a direction being distanced from the bottom portion so as to be interposed, respectively, between the plurality of intermediate portions of the transmission electrode, wherein the reception region of the piezoelectric layer includes a plurality of second piezoelectric layers electrically connected in parallel and that are laminated in a direction being distanced from the bottom portion, and wherein the number of first piezoelectric layers is equal to or greater than the number of second piezoelectric layers.

11. The ultrasonic sensor according to claim 1, wherein a surface area of a surface of the transmission region at a side bonded to the inner surface of the bottom portion is equal to or larger than a surface area of a surface of the reception region at a side bonded to the inner surface of the bottom portion.

12. The ultrasonic sensor according to claim 1, wherein a thickness of the transmission region in a direction orthogonal to the bottom portion is smaller than a thickness of the reception region in the direction orthogonal to the bottom portion.

13. The ultrasonic sensor according to claim 1, wherein the piezoelectric element is configured to perform bending vibration together with the bottom portion of the case.

14. The ultrasonic sensor according to claim 1, wherein the common electrode includes a plurality of surface layers disposed on opposing outer surfaces of the piezoelectric layer and at least one intermediate layer disposed within the piezoelectric layer.

15. The ultrasonic sensor according to claim 14, wherein the transmission electrode comprises a plurality of intermediate portions disposed between the at least one intermediate layer of the common electrode and the plurality of surface layers of the common electrode, respectively.

16. A ultrasonic sensor comprising:
a case having a bottom portion; and
a piezoelectric element that is bonded to an inner surface of the bottom portion, the piezoelectric element including:
  a piezoelectric layer having a transmission region, a reception region, and an isolation region disposed between the transmission region and the reception region in a direction orthogonal to the bottom portion of the case;
  a common electrode having at least one portion facing or disposed within the transmission region, the reception region and the isolation region of the piezoelectric layer;
  a transmission electrode opposed to the common electrode with the transmission region interposed therebetween; and
  a reception electrode opposed to the common electrode with the reception region interposed therebetween,
wherein the common electrode does not oppose either the transmission electrode or the reception electrode where the common electrode faces or is disposed within the isolation region in the direction orthogonal to the bottom portion of the case, and
wherein at least one of the transmission electrode and reception electrode extends into the isolation region in a direction parallel to the bottom portion of the case.

17. The ultrasonic sensor according to claim 16, wherein the common electrode extends into the isolation region in the direction parallel to the bottom portion of the case.

18. The ultrasonic sensor according to claim 16, wherein the transmission electrode extends into the isolation region in the direction parallel to the bottom portion of the case.

19. The ultrasonic sensor according to claim 16, wherein the reception electrode extends into the isolation region in the direction parallel to the bottom portion of the case.

20. An ultrasonic sensor comprising
a case having a bottom portion; and
a piezoelectric element that is bonded to an inner surface of the bottom portion, the piezoelectric element including:
  a piezoelectric layer having a transmission region, a reception region, and an isolation region disposed between the transmission region and the reception region in a direction orthogonal to the bottom portion of the case;
  a common electrode having at least one portion facing or disposed within the transmission region, the reception region and the isolation region of the piezoelectric layer;
  a transmission electrode opposed to the common electrode with the transmission region interposed therebetween; and
  a reception electrode opposed to the common electrode with the reception region interposed therebetween,
wherein the common electrode does not oppose either the transmission electrode or the reception electrode where the common electrode faces or is disposed within the isolation region in the direction orthogonal to the bottom portion of the case, and
wherein the reception electrode comprises at least one disk and the transmission electrode comprises a plurality of intermediate portions disposed in the transmission region of the piezoelectric layer, wherein the number of intermediate portions is greater than the number of the at least one disk.

* * * * *